(12) United States Patent
Al-Zareer et al.

(10) Patent No.: US 12,447,865 B2
(45) Date of Patent: Oct. 21, 2025

(54) THERMAL MANAGEMENT SYSTEM FOR ELECTRIC VEHICLE

(71) Applicant: Taiga Motors Inc., Lasalle (CA)

(72) Inventors: Maan Al-Zareer, Palo Alto, CA (US); Amiel Suarez, Montreal (CA)

(73) Assignee: Taiga Motors Inc., Lasalle (CA)

( * ) Notice: Subject to any disclaimer, the term of this patent is extended or adjusted under 35 U.S.C. 154(b) by 322 days.

(21) Appl. No.: 18/206,824

(22) Filed: Jun. 7, 2023

(65) Prior Publication Data
US 2024/0123867 A1    Apr. 18, 2024

Related U.S. Application Data

(60) Provisional application No. 63/416,720, filed on Oct. 17, 2022.

(51) Int. Cl.
| | |
|---|---|
| *B60L 58/26* | (2019.01) |
| *B60K 11/02* | (2006.01) |
| *B60L 50/60* | (2019.01) |
| *B60L 50/64* | (2019.01) |
| *F28D 1/06* | (2006.01) |

(52) U.S. Cl.
CPC .............. *B60L 58/26* (2019.02); *B60K 11/02* (2013.01); *B60L 50/64* (2019.02); *B60L 50/66* (2019.02); *F28D 1/06* (2013.01)

(58) Field of Classification Search
CPC .......... B60L 58/26; B60L 50/64; B60L 50/66; F28D 1/06; F28D 1/0308
See application file for complete search history.

(56) References Cited

U.S. PATENT DOCUMENTS

| | | | |
|---|---|---|---|
| 9,149,896 B1* | 10/2015 | Batty | B21D 53/08 |
| 10,044,081 B2* | 8/2018 | Rawlinson | H01M 10/653 |
| 2002/0081471 A1* | 6/2002 | Keegan | H01M 8/04089 |
| | | | 429/513 |
| 2018/0269547 A1* | 9/2018 | Robert | H01M 10/6554 |
| 2021/0234212 A1 | 7/2021 | Gaigg et al. | |

OTHER PUBLICATIONS

Yong Hwan Choi, et al., "Development of Standardized Battery Pack for Next Generation PHEVs in Considering the Effect of External Pressure on Lithium-Ion Pouch Cells", SAE International, Published Apr. 3, 2018.

* cited by examiner

*Primary Examiner* — Huan Le
(74) *Attorney, Agent, or Firm* — Dicke, Billig & Czaja, PLLC

(57) ABSTRACT

An electric vehicle including a battery including a plurality of battery cells and a plurality of thermal control panels interleaved with the plurality of battery cells to form a battery stack, each thermal control panel including walls defining at least one fluid channel. At least one retention element applies a retention pressure to the battery stack to compress the plurality of battery cells and plurality of thermal control panels of the battery stack, the walls of the thermal panels being under compression by a stack pressure including at least the retention pressure. A pump circulates a thermal transfer fluid through the at least one fluid channel of each thermal panel, the pump to create a fluid pressure within the at least one fluid channel of each thermal panel that is greater than or equal to the stack pressure.

22 Claims, 22 Drawing Sheets

DETAIL D

THERMAL MANAGEMENT SYSTEM FOR ELECTRIC VEHICLE

CROSS-REFERENCE TO RELATED APPLICATION(S)

This application claims priority from U.S. Provisional Patent Application No. 63/416,720, filed Oct. 17, 2022, which is incorporated by reference in its entirety herein.

TECHNICAL FIELD

The present disclosure relates generally to electric vehicles, including electric powersports vehicles, and, more particularly, to examples of a thermal management system for an electric vehicle.

BACKGROUND

Electric vehicles (EVs), including electric powersport vehicles, have rechargeable batteries to store energy and provide power for the vehicle. The battery is charged/recharged directly from a power grid via a charging station and/or by regenerative braking which converts some of the vehicle's kinetic energy into electrical energy. The battery is discharged to power an electric motor of the vehicle and other accessories. The flow of current during the charging and discharging processes creates heat in the battery cells. The higher the electric current, the greater the heat created in the battery.

SUMMARY

One example provides an electric vehicle having a battery including a plurality of battery cells and a plurality of thermal control panels interleaved with the plurality of battery cells to form a battery stack, each thermal control panel including walls defining at least one fluid channel. At least one retention element applies a retention pressure to the battery stack to compress the plurality of battery cells and plurality of thermal control panels of the battery stack, the walls of the thermal panels being under compression by a stack pressure including at least the retention pressure. A pump circulates a thermal transfer fluid through the at least one fluid channel of each thermal panel, the pump to create a fluid pressure within the at least one fluid channel of each thermal panel that is greater than or equal to the stack pressure.

One example provides a method including filling a primary coolant tank of a thermal management system of an electric vehicle with a thermal transfer fluid, and fluidically connecting a supplementary coolant source to the primary coolant tank, the supplementary coolant source separate from the electric vehicle. A pump of the thermal management system is operated to draw thermal transfer fluid from the primary coolant tank to fill fluid pathways of the thermal management system, the fluid pathways including at least one fluid channel within each of a plurality of thermal panels interleaved with a plurality of battery cells in a battery of the electric vehicle, wherein the thermal transfer fluid is drawn from the supplementary coolant source into the primary coolant tank as thermal transfer fluid is drawn from the primary coolant tank into the fluid pathways. The method further includes disconnecting the external supplementary tank from the primary coolant tank.

One example provides a thermal management system for an electric vehicle, the thermal management system including a plurality of thermal panels interleaved between battery cells in a battery stack of the electric vehicle, the thermal panels and battery cells held together under a retention pressure, each thermal panel defining at least one fluid channel. A pump operates to circulate a thermal transfer fluid through the fluid channels, the pump to operate to create a fluid pressure greater than or equal to the stack pressure such that the thermal transfer fluid supports the at least one fluid channel of each thermal panel to inhibit collapse of the at least one fluid channel.

Additional and/or alternative features and aspects of examples of the present technology will become apparent from the following description and the accompanying drawings.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

EVs typically employ rechargeable lithium ion battery cells. The performance and lifetime of lithium ion battery cells is greatly dependent on temperature. When overheated, the battery cells can experience accelerated deterioration, cell damage, and other undesirable effects. Additionally, when exposed to very low temperatures, the operating efficiency and power capacity of the cells is decreased. Furthermore, uneven temperature distribution within lithium ion battery cells, which may result from variable current in a cell, non-uniform cooling, thermal conductivity of an associated battery case/enclosure, and placement of anodes and cathodes, for example, can lead to localized cell deterioration and a reduction in battery life. In view of the above, to optimize operational efficiency and battery life, it is often important for the operating temperatures of lithium ion battery cells of rechargeable battery systems to be well-controlled and maintained within a desired temperature range (e.g., a relatively constant temperature with very low temperature deviations).

The present disclosure provides examples of a thermal management system for an EV, where the thermal management system includes flexible, lightweight thermal control panels which are interleaved with battery cells of a rechargeable battery pack of the EV, and through which pressurized thermal transfer fluid is circulated to transfer thermal energy to or from the battery cells to maintain the battery cells within a desired temperature range. In examples, the thermal control panels are in direct contact with and provide uniform temperature and pressure distribution across battery cell surfaces to improve battery performance and battery life.

Figure 1:
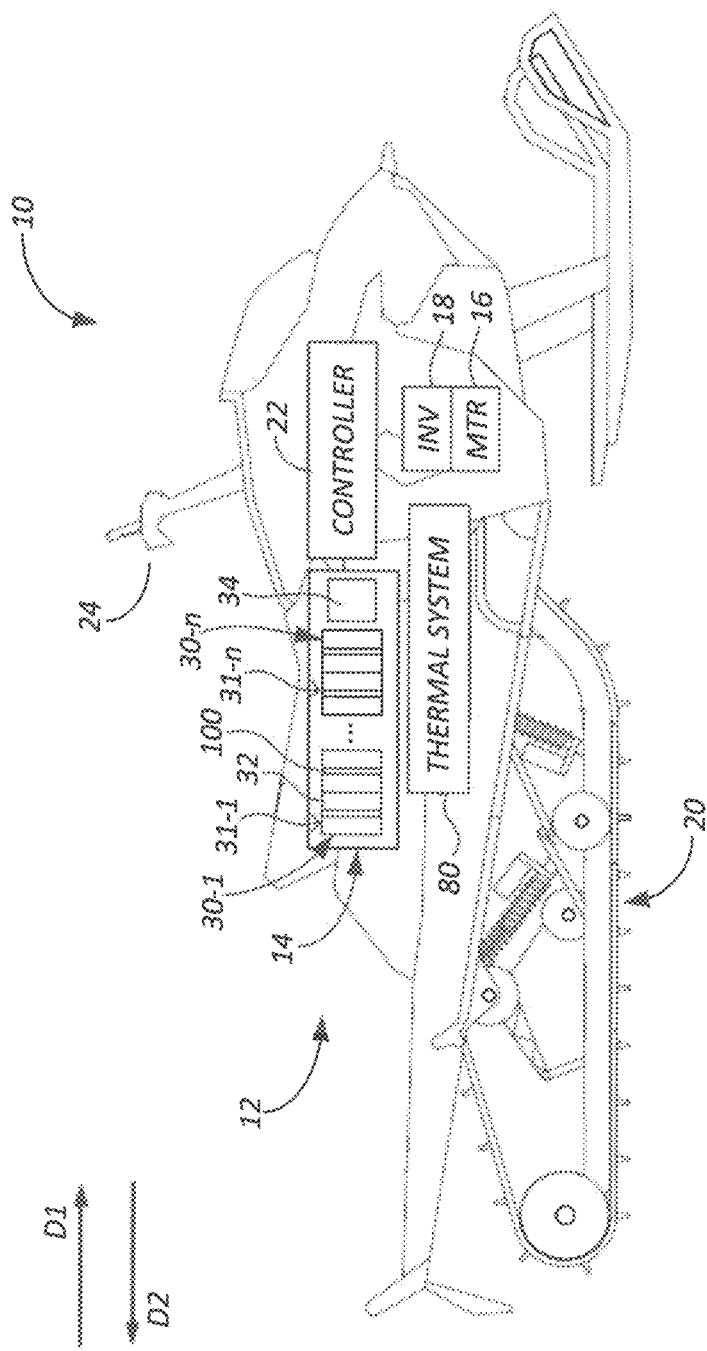
FIG. 1 is a block and schematic diagram generally illustrating an electric vehicle including a pressurized thermal management system, according to one example.

FIG. 1 is a block and schematic diagram generally illustrating an EV 10 employing a thermal management system 80, in accordance with the present disclosure, for maintaining a temperature of at least a rechargeable battery pack 14 of EV 10 within a desired operating temperature range. In one example, EV 10 is an electric powersport vehicle, such as an electric snowmobile 10, as illustrated by FIG. 1. Although illustrated as electric snowmobile 10, thermal management system 80 is suitable for use in any number of other types of electric vehicles, including cars, trucks and other types of electric powersport vehicles such as personal watercraft (PWC), all-terrain vehicles (ATVs), and utility task vehicles (UTVs), including side-by-side vehicles (SSVs), for example.

In examples, electric snowmobile 10 has an electric powertrain 12 including battery pack 14 to power an electric motor 16 via a corresponding electronic motor controller 18 (also referred to as an inverter (INV) and as a power electronics module). Electric motor 16 may be drivingly coupled to a propulsion system, such as drive track 20 in FIG. 1, in a speed-transmitting or torque-transmitting engagement. In various embodiments, motor 16 may be a permanent magnet synchronous motor or a brushless direct current motor, for example. In some examples, motor 16 may have a maximum power output rating of 180 horsepower, for example. In other examples, motor 16 may have a maximum power output rating greater or less than 180 horsepower.

In examples, electronic motor controller 18 converts DC power from battery pack 14 to AC power to drive electric motor 16. In examples, the operation of electric motor 16 and the delivery of power to electric power 16 from battery pack 14 via electronic motor controller 18 is controlled by a controller 22. In examples, controller 22 is operable to control delivery of electrical power from battery pack 14 to electric motor 16 via electronic motor controller 18 by controlling a drive current as a function of one or more input devices, such as a throttle on a control console 24. In examples, based on such inputs, controller 22 is operable to control a torque or rotational speed of electric motor 16 so as to control propulsion of the electric vehicle, in this case, to control operation of drive track 20 of electric snowmobile 10.

The controller 22 includes one or more data processors and non-transitory machine-readable memory. The memory may store machine-readable instructions which, when executed by the processor, cause the processor to perform any computer-implemented method or process described herein. The processor may include, for example, any type of general-purpose microprocessor or microcontroller, a digital signal processing (DSP) processor, an integrated circuit, an application-specific integrated circuit (ASIC), a field programmable gate array (FPGA), a reconfigurable processor, other suitably programmed or programmable logic circuits, or any combination thereof. The memory may include any suitable machine-readable storage medium such as, for example, an electronic, magnetic, optical, electromagnetic, infrared, or semiconductor system, apparatus, or device, or any suitable combination thereof. The memory may be located internally and/or externally to the controller 22.

In one example, battery pack 14 includes one or more battery stacks 30, illustrated as battery stacks 30-1 to 30-$n$, with each battery stack 30 including one or more battery modules 31, illustrated as battery modules 31-1 to 31-$n$, with each battery module 31 including one or more battery cells 32. Battery cells 32 in each battery stack 30 may be arranged in a row or column. Battery cells 32 of each battery stack 30 are electrically interconnected, and battery stacks 30, in turn, are electrically interconnected to form battery pack 14 having desired electrical characteristics (e.g., output voltage and capacity). In some examples, battery pack 14 provides a high voltage output, such as in the range of 300-400 VDC, and in some cases 800 VDC. In examples, each battery cell 32 comprises a lithium-ion battery cell, although other suitable battery chemistries and configurations may be employed. In examples, battery pack 14 includes a battery management module 34 which, among other functions, monitors various operating parameters of battery pack 14, including operating parameters of battery stacks 30, battery modules 31, and battery cells 32, with operating parameters including parameters such as temperatures, voltages, and current levels, for example.

In examples, each of battery modules 31 include at least one thermal control panel 100 (also referred to as a "thermal panel", "thermal management panel" and "cooling panel"), where thermal control panels 100 are part of thermal management system 80 for managing the temperature of battery cells 32 of modules 31, as well as other components of snowmobile 10, such as electric motor 16 and electronic motor controller 18, for example. In one example, as will be described in greater detail below, battery cells 32 and thermal control panels 100 are arranged in an alternating fashion to form each battery module 31, with battery modules 31, in turn, being arranged in a stack-like fashion to form each battery stack 30. In some examples, snowmobile 10 includes elements of thermal control panels (referred to as "cooling panels"), battery modules, battery stacks, and cooling system arrangements described in U.S. patent application Ser. No. 17/091,777 entitled "Battery Cooling Panel for Electric Vehicles", the entirety of which is incorporated herein by reference.

Figure 2:
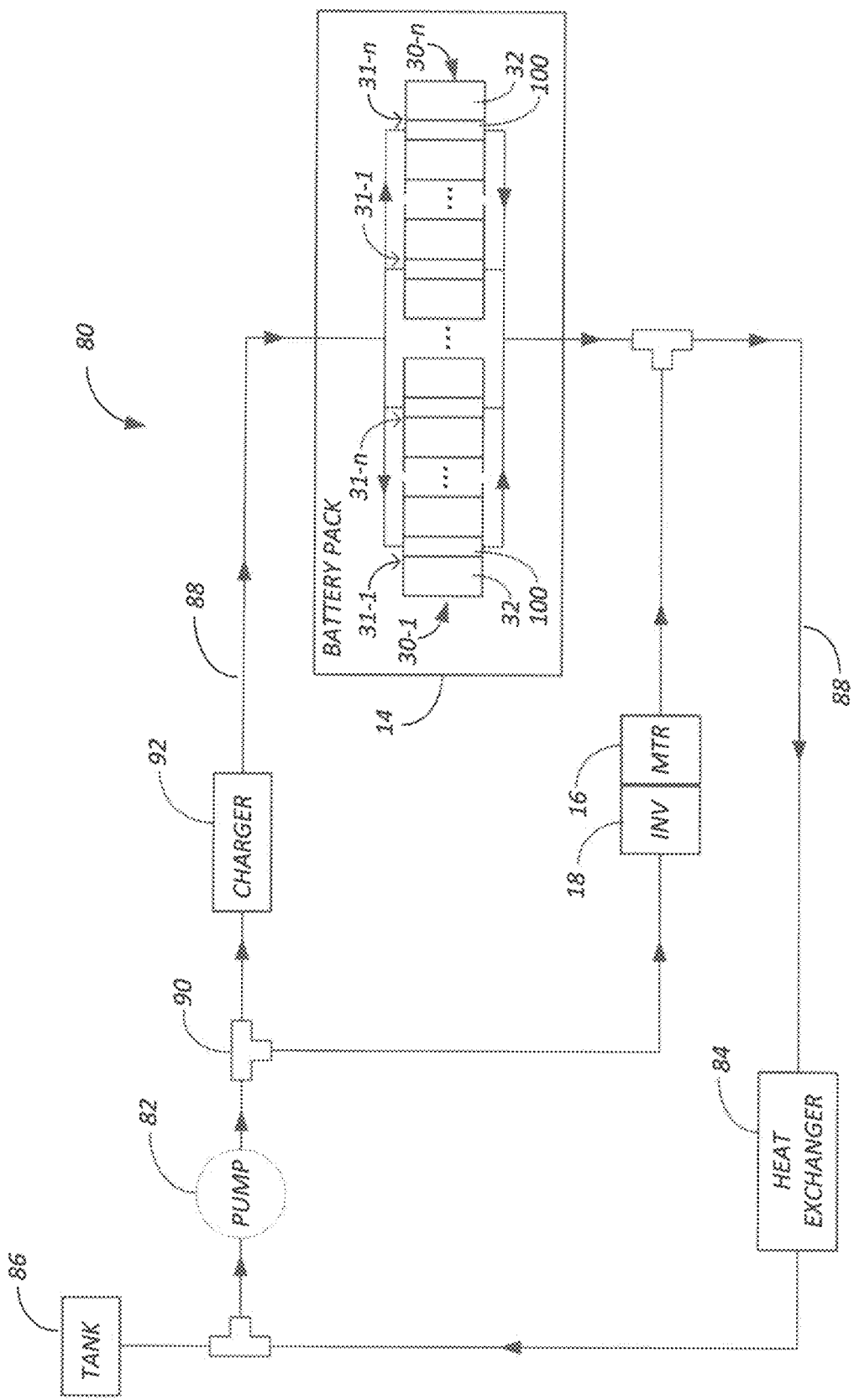
FIG. 2 is a block and schematic diagram generally illustrating a thermal management system, according to one example.

FIG. 2 is block and schematic diagram generally illustrating thermal management system 80, according to one example. In addition to thermal control panels 100, thermal management system 80 includes a pump 82, a heat exchanger 84, a tank 86 (e.g., a fluid reservoir), and a number of fluid circulation paths 88 through which a thermal transfer fluid is circulated through a number of components of electric snowmobile 10 (as indicated by the arrows in FIG. 2) to manage the temperatures thereof. In one example, as illustrated, in addition to circulating thermal transfer fluid through thermal control panels 100 of battery pack 14, thermal management system 80 is configured to circulate thermal transfer fluid through motor 16, inverter 18, and an electric charger 92 (for charging battery pack 14).

In examples, thermal management system 80 includes one or more valves 90 to form a number of circulation loops to control the components of EV 10 through which thermal transfer fluid is circulated (e.g., based on operating conditions of snowmobile 10). According to one example, as will be described below, pump 82 circulates thermal transfer fluid through cooling panels 100 of battery modules 31 to extract heat from battery cells 32, with the extracted heat subsequently removed from the thermal transfer fluid via heat exchanger 84 to thereby maintain an operating temperature of battery cells 32 within a desired temperature range. In some examples, pump 82 produces an output pressure between 10-15 psi. Other output pressures are also contemplated.

In some examples, thermal management system 80 may include a heater (not shown) to warm the thermal transfer fluid and subsequently warm battery cells 32. Such a heater may be activated when snowmobile 10 is left in cold environments where battery cells 32 may drop below a minimum temperature threshold.

In some examples, thermal management system 80 may provide at least two fluid circulation loops: a first loop including pump 82, valves 90, charger 92, battery pack 14, and heat exchanger 84; and a second loop including pump 82, valves 90, inverter 18, electric motor 16, and heat exchanger 84. Controller 22 may operate valves 90 to selectively circulate thermal transfer fluid through only the first fluid circulation loop, only the second fluid circulation loop, or both the first and the second circulation loop simultaneously. Controller 22 may enable the first and/or second fluid circulation loops as required based on the temperature of the components in each loop. For example, the first fluid circulation loop may be enabled when the temperature of charger 92 and/or battery pack 14 exceeds a threshold temperature, and the second fluid circulation loop may be enabled when the temperature of inverter 18 and/or electric motor 16 exceeds a threshold temperature.

Although thermal management system 80 and thermal control panels 100 may also be employed to transfer heat to the battery cells 32, thermal management system 80 and thermal control panels 100 may be employed primarily for cooling of battery cells 32 and other vehicle components. As such, hereinafter, thermal control panels 100 are referred to as "cooling panels 100" and the thermal transfer fluid is referred to as either a "coolant" or a "coolant fluid".

Figure 3:
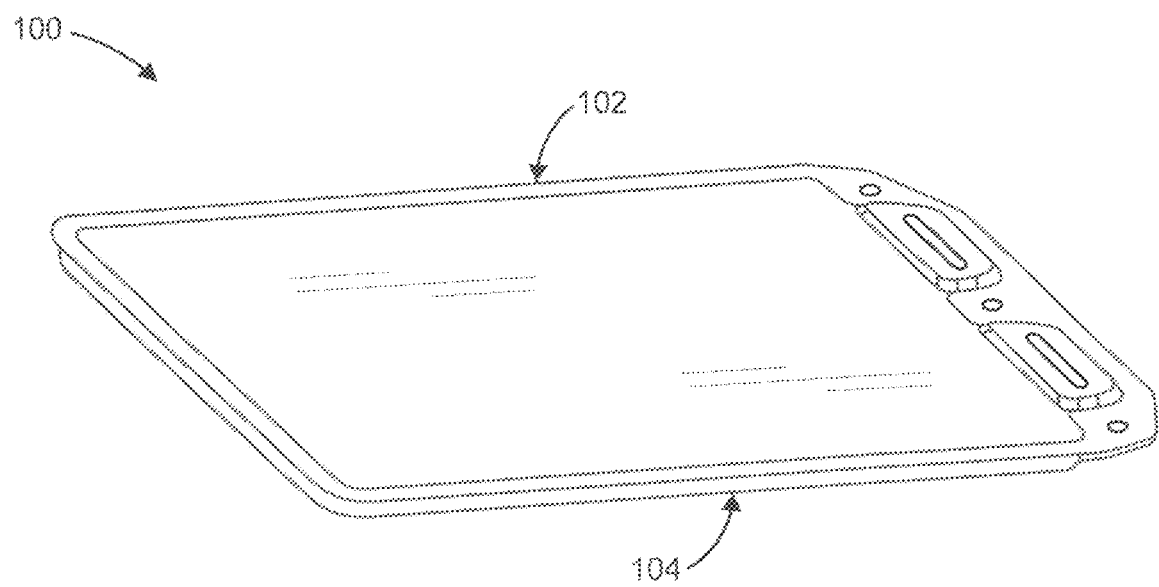
FIG. 3 is a perspective view of one example of a battery cooling panel.

FIGS. 3-19 illustrate example implementations of cooling panels 100, battery modules 31, and battery stacks 30, in accordance with the present disclosure. FIG. 3 is an isometric view generally illustrating cooling panel 100, according to one example. Cooling panel 100 includes a first outer panel 102 and an opposing second outer panel 104 with a panel insert 106 (not illustrated in FIG. 3) disposed within a sealed space there between, wherein, as will be described in greater detail below, inner surfaces of first and/or second outer panels 102 and 104 and grooves within panel insert 106 together form cooling flow channels (also referred to as "fluid channels") through which a coolant fluid flows to cool/heat battery cells disposed in contact with exterior surfaces of first and second outer panels 102 and 104. Cooling panel 100 provides for efficient and uniform cooling of a battery cell, such as a pouch battery cell, a cylindrical battery cell and/or a prismatic battery cell. In one example, the battery cooling panel is suitable for use with a lithium ion battery cell in an electric vehicle, such as electric snowmobile 10.

Figure 4:
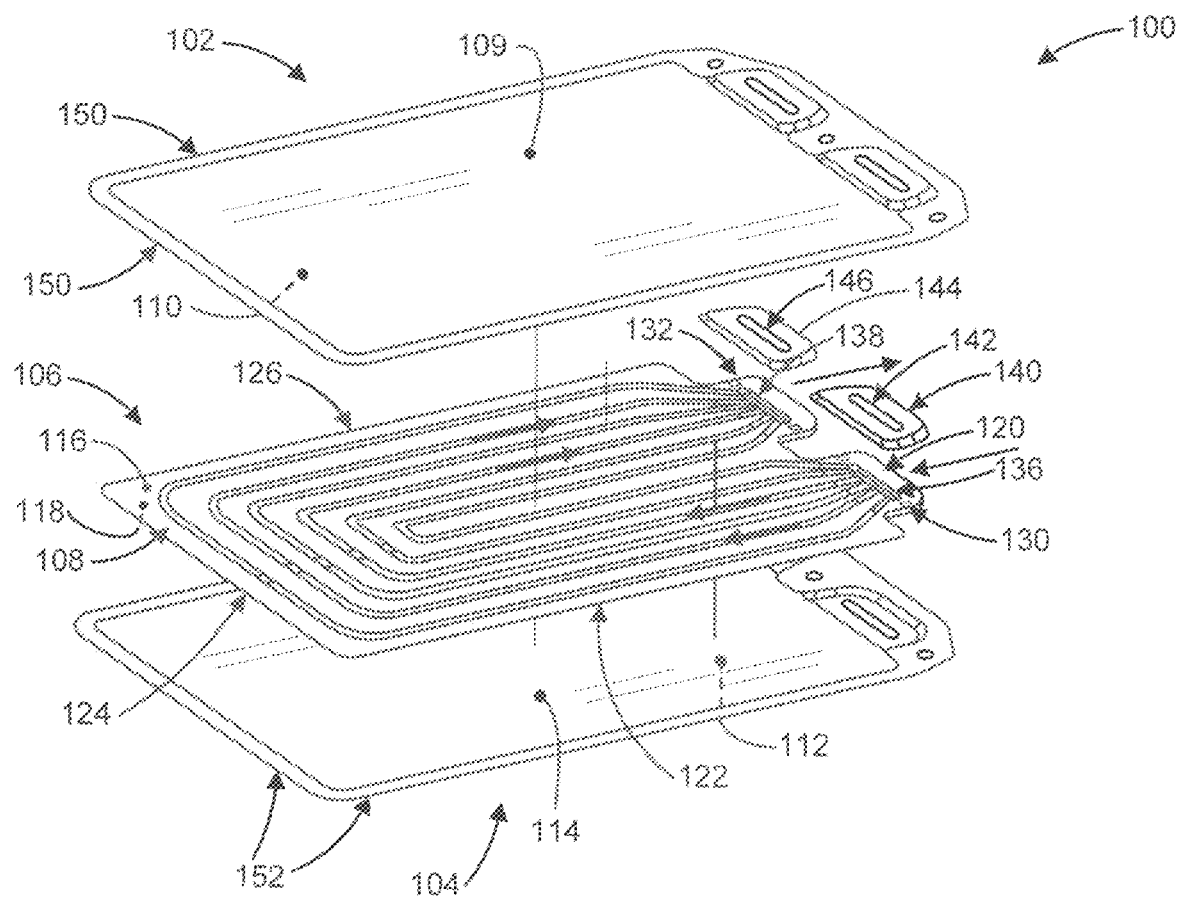
FIG. 4 is one example of an exploded view of the panel of FIG. 1.

FIG. 4 is an exploded isometric view of the battery cooling panel 100, according to one example. Battery cooling panel includes a first outer panel 102 and a second outer panel 104. The first outer panel 102 may be defined as a cooling fin, and includes a first major (exterior) surface 109 and an opposing second major (interior) surface 110, where first major surface 109 is configured to contact a battery cell (e.g., a first battery cell). The second outer panel 102, which may also be defined as a cooling fin, includes a first major (exterior) surface 112 and a second major (interior) surface 114, where first major surface 112 may also contact a battery cell (e.g., a second battery cell). In one embodiment, both of the first major surface 109 of first outer panel 102 and first major surface 112 of second outer panel 104 are substantially planar.

Panel insert 106 includes a first major surface 116 and a second surface 118 and includes open grooves 108 which extend at least partially through panel insert 106. In examples, panel insert 106 is made of a polymeric material. In one example, the polymeric material is polyethylene (PE). In another example, the polymeric material is polypropylene. In examples, open grooves 108 are formed or molded in the polymeric material. In other examples, grooves 108 may be formed in another manner such as by cutting, etching or abrading grooves in the surface of the polymeric material. In one example, grooves 108 extend partially through panel insert 106 from first surface 116 toward second surface 118 so as to be open to interior surface 110 of first outer panel 102. In another example, as illustrated, grooves 108 extend entirely through panel insert 106 between first and second major surface 116 and 118 so as to be open to both first outer panel 102 and second outer panel 104.

In examples, as will be described in greater detail below, panel insert 106 is positioned between the first outer panel 102 and the second outer panel 104, with first major surface 116 of panel insert 106 facing interior surface 110 of first outer panel 102, and second major surface 118 facing interior surface 114 of second outer panel 104. In examples, as will be described in greater detail below, the first outer panel 102 and the second outer panel 104 operate to enclose the panel insert 106, with interior surface 110 of first outer panel 102 sealing against first major surface 116 of panel insert 106, and interior surface 114 of second outer panel 104 sealing against second major surface 118 of panel insert 106 so as to transform grooves 108 into cooling flow channels 108 within the battery panel. In examples, panel insert 106 forms a portion of the inner sidewalls of each flow channel 108 and interior surfaces 110 and 114 of first and second outer panels 102 and 104 form a remaining portion of the inner sidewalls of each flow channel 108. In one example, flow channels 108 may be rectangular in cross-section, with panel insert 106 forming a first pair of opposing sidewalls and interior surfaces 110 and 114 of first and second outer panels 102 and 104 forming a second pair of opposing sidewalls of cooling flow channels 108, where the opposing sidewalls formed by first and second outer panels 102 and 104 (via exterior surfaces 109 and 118) are in contact with battery cells 32. In examples, pump 82 of thermal management system 80 pumps coolant fluid through flow channels 108 to cool (or heat) battery cells 32 of battery pack 14 (e.g., see FIG. 2) during operation of electric snowmobile 10.

In examples, the channels 108 run from an edge of panel insert 106, throughout the panel insert 106, and back to an edge of the panel insert. In one embodiment, panel insert 106 includes an edge 120, 122, 124 and 126. An inlet channel endplate 130 and an outlet channel endplate 132 are located at edge 120. Inlet channel endplate 130 and outlet channel endplate 132 can be separate pieces or extend from panel insert 106. Channels 108 begin at inlet channel endplate 130, run throughout panel insert 106 (e.g., in a circular or semi-circular manner) and exit at outlet channel endplate 132. Inlet channel endplate 130 includes an opening 136 to allow coolant fluid to flow into channels 108. Outlet channel endplate 132 includes an opening 138 to allow coolant fluid to exit or flow out of channels 108. In this manner, coolant fluid enters panel insert 106 at inlet channel endplate 130, flows through the channels 108 removing excess heat from a battery cell, and exits at outlet channel endplate 132. Inlet channel endplate 130 may also include an endplate cover 140 having an opening 142 that aligns with opening 136. Outlet channel endplate 132 may also include an endplate cover 144 having an opening 146 that aligns with opening 138.

Figure 5:
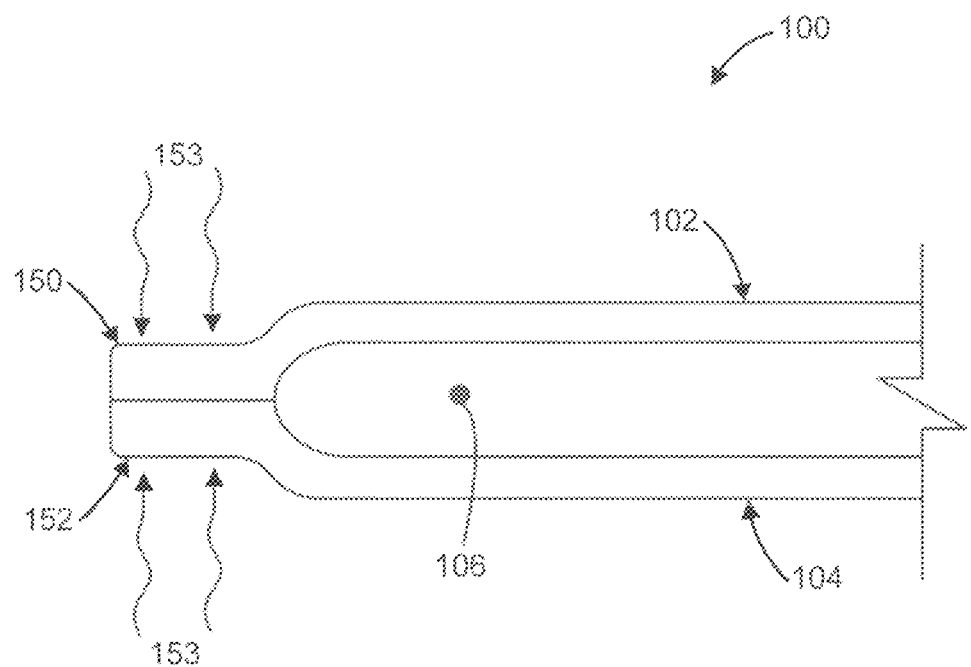
FIG. 5 is a partial cross-sectional view illustrating one example of an edge seal.
Figure 6:
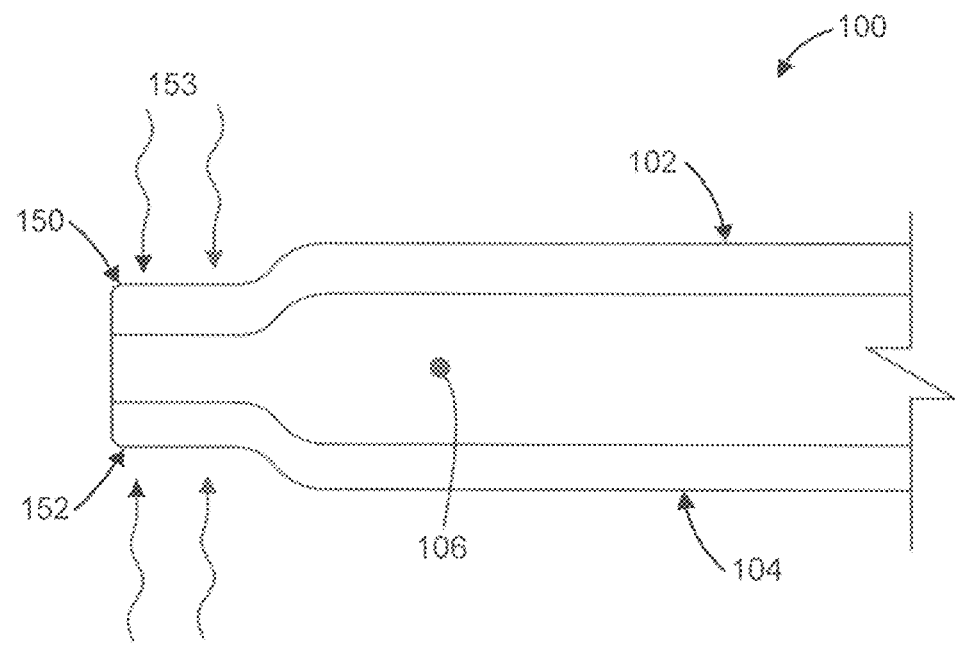
FIG. 6 is a partial cross-sectional view illustrating another example of an edge seal.

First outer panel 102 and second outer panel 104 are made in the form of a sheet, which may be a flexible, non-rigid sheet. The flexible, non-rigid properties of first outer panel 102 and second outer panel 104 may help cooling panel 100 improve contact with adjacent battery cells, and thereby improve heat transfer between cooling panel 100 and battery cells. For example, first outer panel 102 and/or second outer panel 104 may conform to the shape of adjacent battery cells to provide a larger contact area for conductive heat transfer. Further, flexible, non-rigid panels may be lighter than rigid alternatives. In one example, the panels 102, 104 are made of a thin film sheet of polymeric material. In one example, the first outer panel 102 is secured to the second outer panel 104 at their outer edges 150, 152, respectively. The first outer panel 102 can be sealed to the second panel 104, for example, by heat sealing, pressure sealing, and/or by using an added adhesive. FIG. 5 illustrates an end portion of battery cooling panel 100 where first outer panel 102 is sealed to second outer panel 104 at outer edges 150, 152 using a heat sealing treatment 153. Panel insert 106 is positioned inside the battery cooling panel 100, and allowed to securely float in between the first outer panel 102 and the second outer panel 104. FIG. 6 illustrates another example at an end portion of battery cooling panel 100 where first outer panel 102, second outer panel 104 and panel insert 106 are all heat sealed 153 at an outer edge. It is recognized that the first outer panel 102 and the second outer panel 104 may be selectively sealed to panel insert 106 at locations other than near the outer edge of the battery cooling panel 100.

When first outer panel 102 and second outer panel 104 are sealed about panel insert 106, due to the flexible, non-rigid properties of the sheet material, the sheet material of panels 102, 104 may deform so as to conform about parts of panel insert 106 so that once sealed together, the inner surfaces 110 and 114 of first and second outer panels 102 and 104 are securely pressed against the first and second surfaces 116 and 118 of panel insert 106.

The first outer panel 102 and second outer panel 104 when made of a thin film sheet or foil may be formed of a single layer or multiple layers. Advantages of layered thin film sheets include very light weight, ease of manufacture, and being inexpensive for material costs and manufacture. Further advantages include durability and structural soundness.

Figure 7:
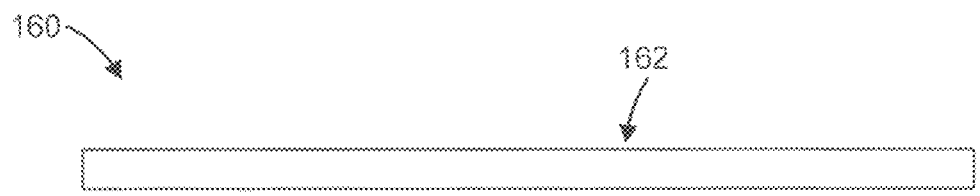
FIG. 7 is one example of an outer panel.

FIG. 7 illustrates at 160 one embodiment of an outer panel sheet formed of a single layer 162 of polymeric material. In one or more examples, the polymeric material is polyethylene, polythene, or polyethylene terephthalate (i.e., a polyester). The thin film sheet can be made of low density or high density materials. In one embodiment, the thin film sheet has a thickness in the range of 5 microns-50 microns, with a weight in the range of 20 grams-200 grams.

Figure 8:
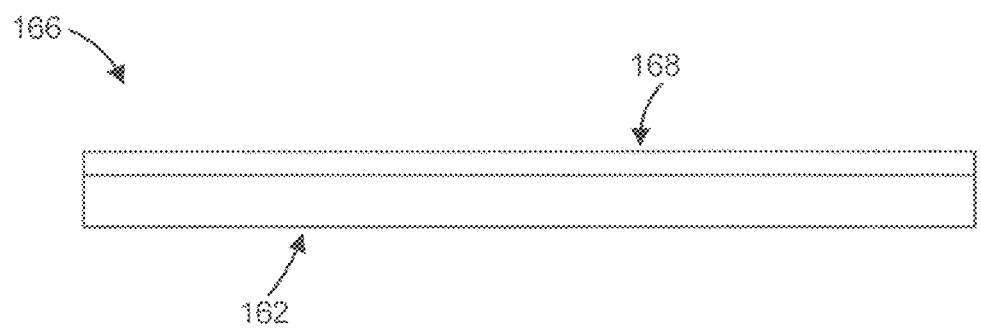
FIG. 8 is another example of an outer panel.

FIG. 8 illustrates at 166 one embodiment of an outer panel sheet formed of multiple layers. In this embodiment, the sheet 166 includes layer 162 formed of a polymeric material with a second layer 168 different from the first layer. In one embodiment, the second layer 168 is a metal film or foil layer. In one example, the second layer 168 is an aluminum coated thin film layer. The advantages of second layer 168 include enhanced barrier and structural properties. The second layer 168 may additionally provide a matt surface, a shiny surface or decorative surface properties. The metal film layer is very thin, in a range of 5-50 micrometers.

Figure 9:
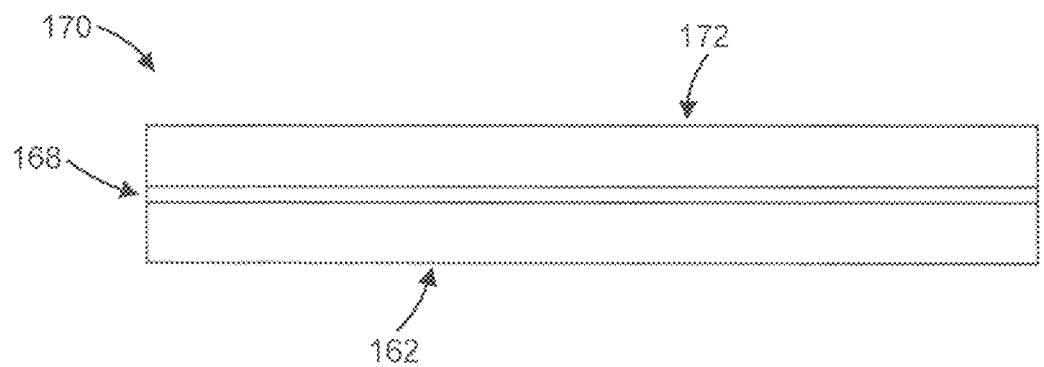
FIG. 9 is another example of an outer panel.

FIG. 9 illustrates at 170 one embodiment of an outer panel sheet formed of multiple layers. In this embodiment, the sheet 170 includes layer 162, layer 168, and an additional foil or layer 172. Layer 172 can be formed of a metallic or polymeric material. In one example, layer 162 is a polymeric material, layer 168 is a metal layer, and layer 172 is a polymeric material. The layer 172 is an outer foil that can provide additional resistance to scratches, tears and other outside influences such as interfacing with a battery cell.

Figure 10:
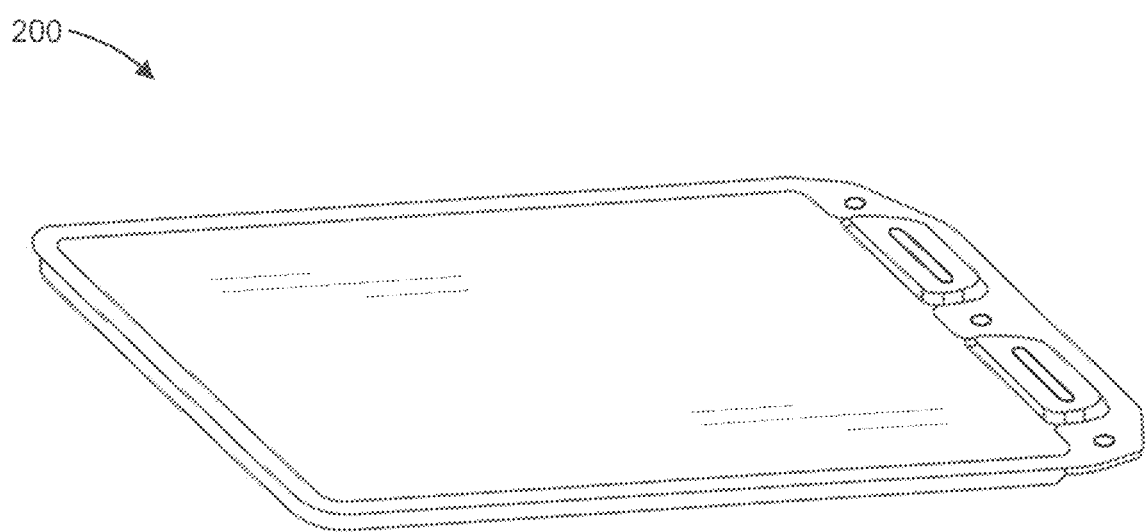
FIG. 10 is another example of a battery cooling panel assembly.
Figure 11:
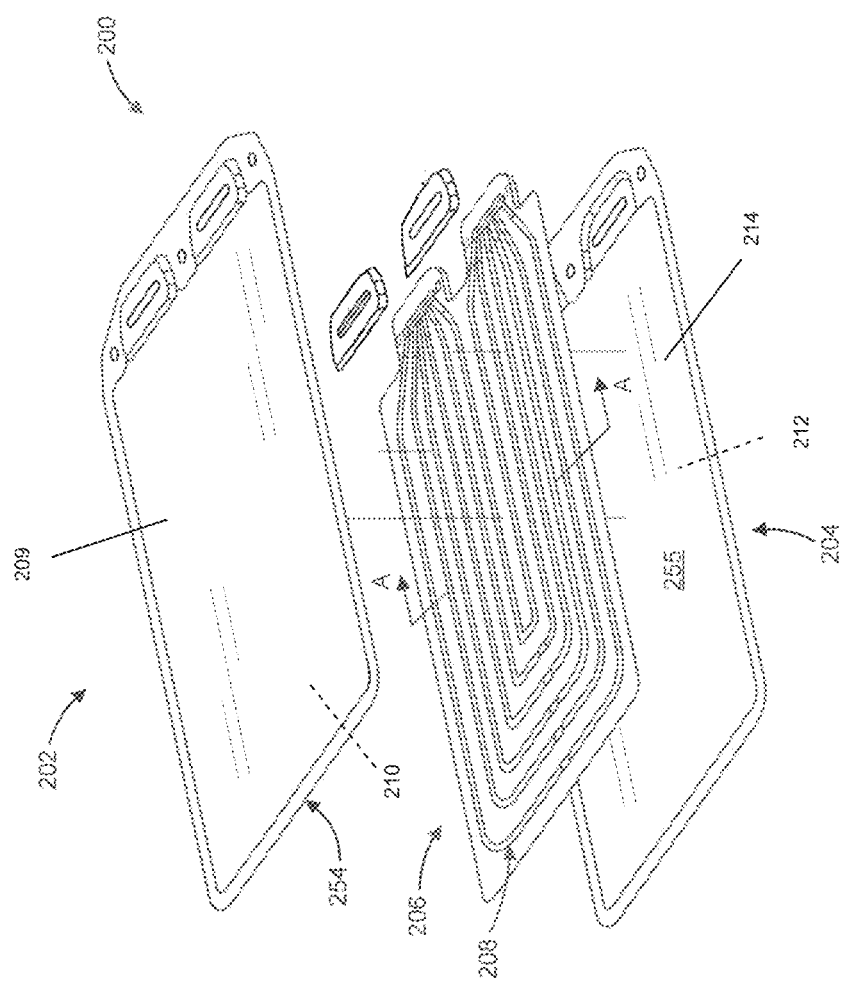
FIG. 11 is one example of an exploded view of the panel of FIG. 10.

FIG. 10 illustrates another embodiment of a battery cooling panel generally at 200. FIG. 11 is an exploded view of the battery cooling panel 200. Battery cooling panel 200 is similar to battery cooling panel 100 previously described herein and similar elements are labeled with element numbers incremented by one hundred. Battery cooling panel 200 provides for efficient and uniform cooling of a battery cell, such as a pouch battery cell. In one example, the battery cooling panel 200 is used for cooling a lithium ion battery cell in an electric vehicle.

Battery cooling panel 200 includes a first outer panel 202 and a second outer panel 204. The first outer panel 202 is defined as a cooling fin. The first outer panel 202 is configured to contact a battery cell. The second outer panel 202 can also be defined as a cooling fin. A panel insert 206 is positioned between the first outer panel 202 and the second outer panel 204. The panel insert 206 includes cooling flow channels 208 to aid in moving coolant fluid through the battery cooling panel 200 to aid in cooling the battery cell.

The first outer panel 202 and the second outer panel 204 operate to enclose the panel insert 206, allowing a coolant fluid to flow through the cooling flow channels within the battery cooling panel. The first outer panel 202 includes a first major surface 209 and a second major surface 210. The first major surface 209 is configured to contact the battery cell. The second outer panel 204 includes a first major surface 212 and a second major surface 214. The second outer panel 204 may also contact a battery cell at the second outer panel first major surface 212. In one embodiment, both of the first outer panel first major surface 209 and the second outer panel first major surface 212 are substantially planar, maximizing contact surface area with the battery cell. The panel insert 206 is positioned between the first outer panel 202 and the second outer panel 204.

Figure 12:
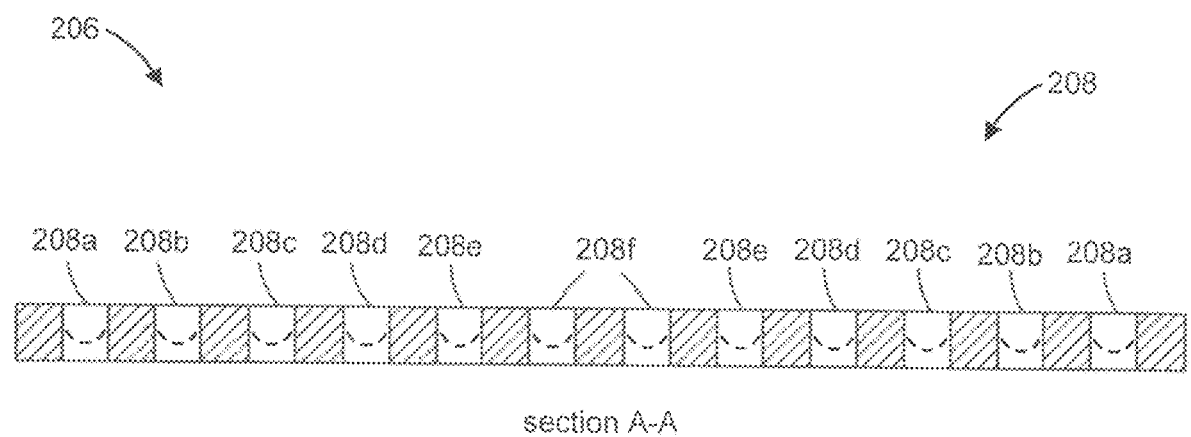
FIG. 12 is a cross-sectional view of the panel insert of FIG. 11.

The first outer panel 202 and the second outer panel 204 are made of a generally rigid polymeric material or metal such as aluminum. The panel insert 206 is made of a generally rigid polymeric material. In one example, the first outer panel 202 is made of aluminum, and includes a formed well area 254 on the second major surface 210. Similarly, the second outer panel 204 includes a formed well area 255. When assembled, first outer panel 202 is secured to second outer panel 204 at their outer edges, such as be welding or an adhesive. In the assembled position, the panel insert 206 fits securely within the area formed by well area 254 and well area 255. FIG. 12 illustrates one example cross-section of panel insert 206. In this example, panel insert 206 includes 6 channels spaced about the panel insert, indicated as 208a, 208b, 208c, 208d, 208e and 208f. The channels extend entirely through the panel insert 206. Alternatively, the channels may only extend partially through the panel insert 206 (illustrated by dashed grooves).

Figure 13:
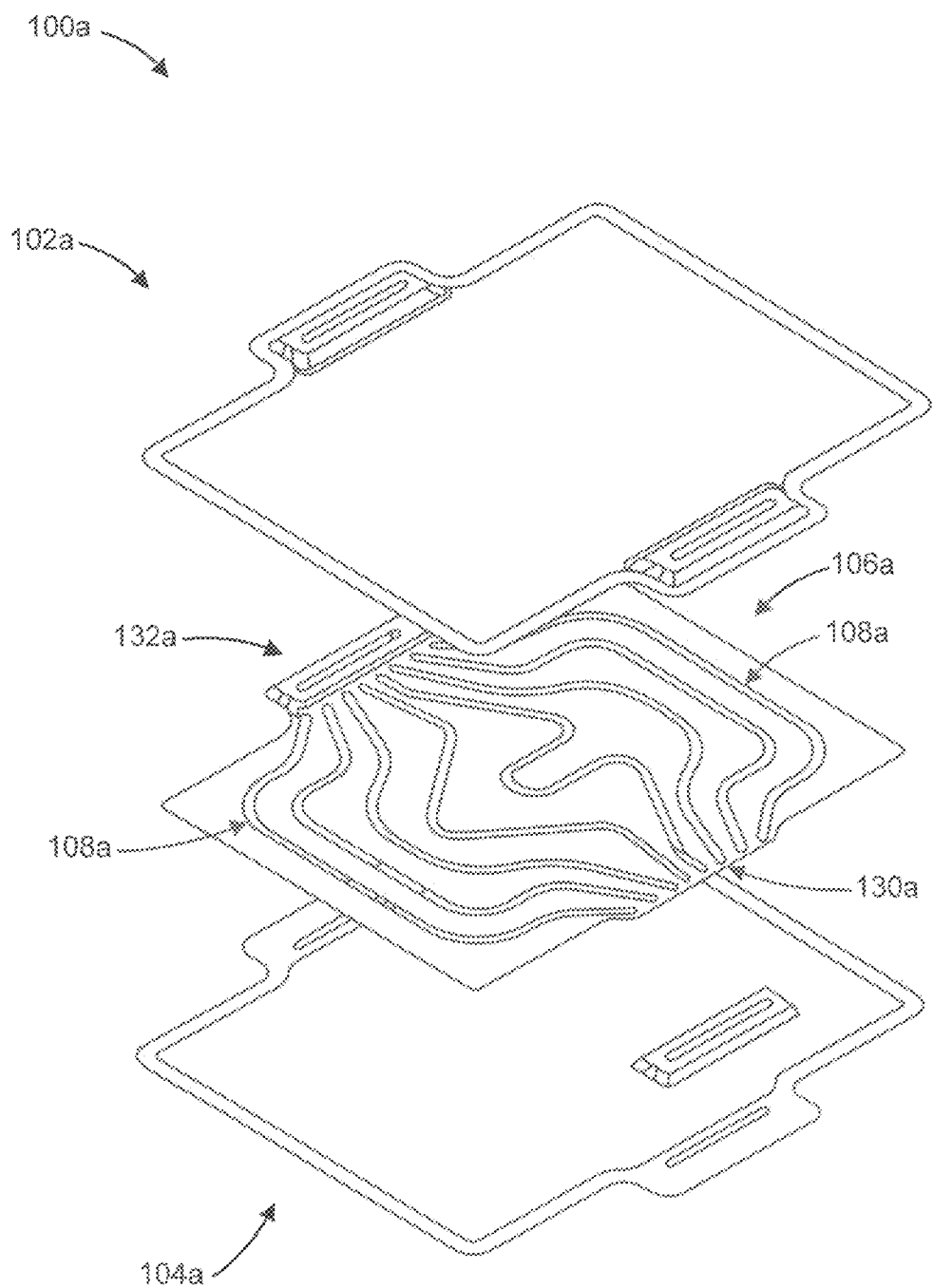
FIG. 13 is another example of a battery cooling panel assembly.

FIG. 13 is an expanded view illustrating another embodiment of a battery cooling panel generally at 100a that is similar to battery cooling panel 100, and where like elements include the same element number with an "a" added. The first outer panel 102a is defined as a cooling fin. The first outer panel 102a is configured to contact a battery cell (not illustrated in FIG. 13). The second outer panel 104a can also be defined as a cooling fin. A panel insert 106a is positioned between the first outer panel 102 and the second outer panel 104. The panel insert 106a includes cooling flow channels 108a to aid in cooling the battery cell. In this embodiment, cooling flow channels 108a start and end on different sides of the panel insert 106a, and as such on different sides of the battery cooling panel 100a. In this example, inlet channel endplate 130a is on one side of the panel insert 106a and outlet channel endplate 130b is at an opposite side of the panel insert 106a. There are eight separate cooling flow channels 108a illustrated, that generally form a circuitous or varied (i.e., not straight) path through the panel insert 106a from inlet channel endplate 130a to outlet channel endplate 132a to aid in maximizing and providing a uniform cooled surface in contact with a battery cell.

Other alternative embodiments for the battery cooling panel illustrated in FIGS. 3-19 are contemplated without departing from the scope of the present disclosure. In one example, the battery cooling panel includes first outer panel 102 secured directly to panel insert 106. In this example, panel insert 106 acts as both the panel insert with coolant flow channels and the second outer panel. Alternatively, the channels may not extend entirely through the panel insert. In this example, there may or may not be a need for a second outer panel. In another example, the battery cooling panel includes a first outer panel and a second outer panel, where the coolant flow channels are formed integral the second outer panel. In this embodiment, the channel structure and also other parts such as the channel plate may be formed integral the second outer panel.

Figure 14:
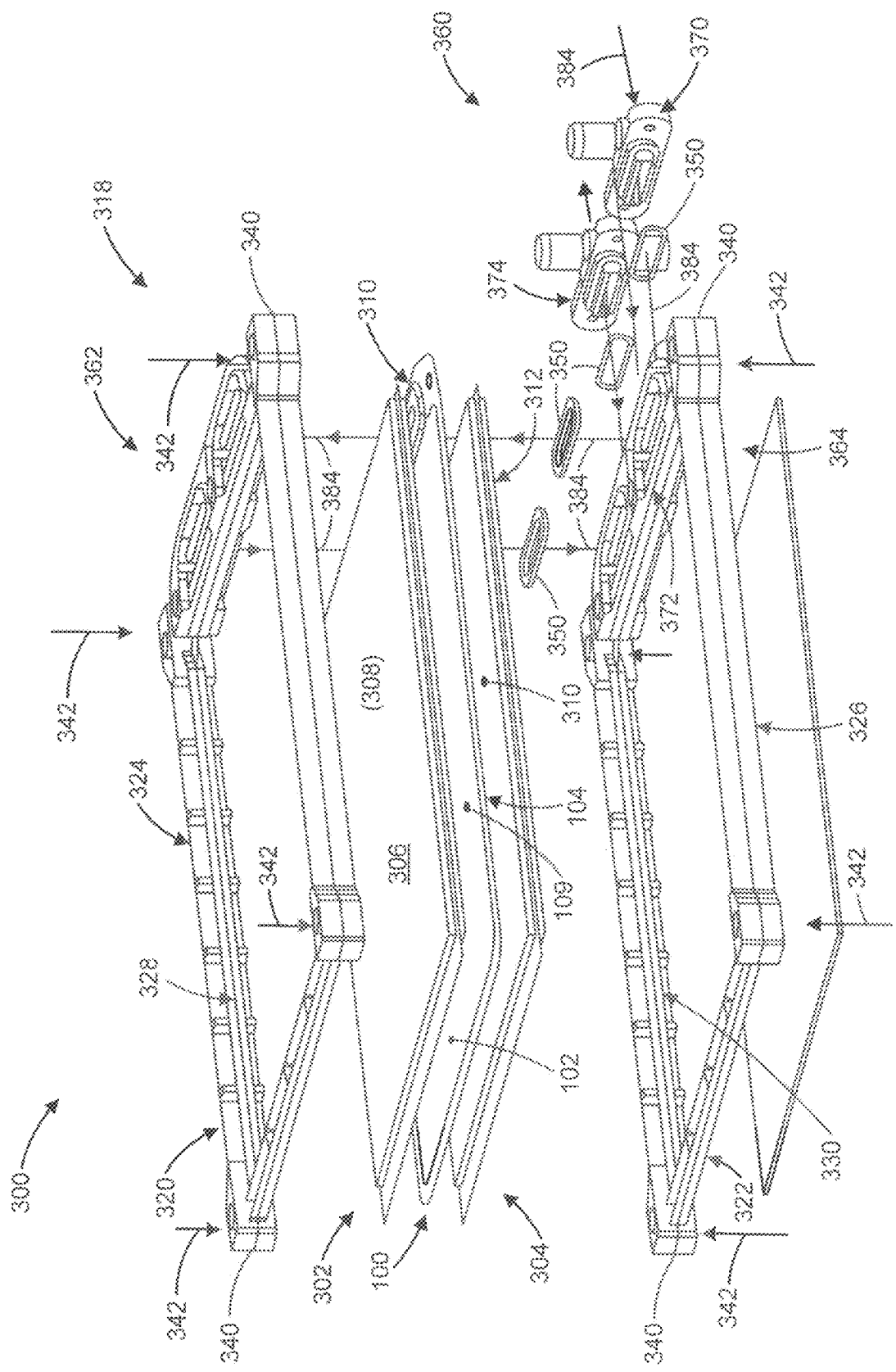
FIG. 14 is an exploded perspective view of one example of a battery module.

FIG. 14 is an exploded view illustrating one embodiment of a battery module subassembly indicated generally at 300. The battery module subassembly 300 is suitable for use in an electric vehicle. One or more battery module subassemblies 300 may be implemented (e.g., stacked) to form battery modules 31 illustrated by FIGS. 1 and 2. The battery module subassembly 300 includes a battery cooling panel immediately adjacent one or more battery cells. Battery module subassembly 300 further includes a manifold system for moving coolant fluid in and out of the battery module, and specifically through the battery cooling panel contained within the battery module subassembly. In this example, the battery cells are pouch battery cells such as a lithium ion battery cell. The battery cooling panel is similar to the battery cooling panel 100 and battery cooling panel 200 described herein, and provides an efficient cost effective way to cool a battery cell. The present design maximizes the cooling surface area at an interface between the battery cooling panel and the battery cell.

Battery module subassembly 300 is in a stack configuration as illustrated. Battery module subassembly 300 includes battery cooling panel 100. Battery cooling panel 100 is positioned between a first battery cell 302 and a second battery cell 304, where battery cells 302 and 304 represent example implementations of battery cells 32 illustrated by FIGS. 1 and 2. Battery cell 302 and battery cell 304 are pouch battery cells. In one example, battery cells 302 and 304 are lithium ion battery cells. Battery cell 302 includes a first battery surface 306 and a second battery surface 308 (not shown). Second battery surface 308 is a generally planar battery surface. Battery cooling panel 100 includes generally planar first outer panel 102 immediately adjacent and having first outer panel first major surface 109 in contact with first battery surface 306. In one aspect, the cooling surface of first outer panel first major surface 109 is in substantially total contact with first battery surface 306. Similarly, battery cell 304 includes a first battery surface 310 and a second battery surface 312. First battery surface 310 is a generally planar battery surface. Battery cooling panel 100 includes generally planar second outer panel 104 (not shown) immediately adjacent and having second outer panel first major surface 112 (not shown) in contact with first battery surface 310. In one aspect, the cooling surface of second outer panel first major surface 112 is in substantially total contact with first battery surface 310.

Battery module subassembly 300 further includes cartridge assembly 318. Cartridge assembly 318 securely retains first battery cell 302, cooling panel 100 and second battery cell 304 together in order to maximize cooling efficiency and uniformity of the batteries by battery cooling panel 100. In one example, cartridge assembly 318 is made of a relatively hard, lightweight polymeric material. Cartridge assembly 318 includes first frame member 320 and second frame member 322. The frame members 320, 322 are generally rectangular shaped and each include an outer wall 324, 326. A retention ledge 328, 330 extends inward from a corresponding outer wall 324, 326. When secured together at corners 340, retention ledges 328, 330 operate to securely retain the first battery cell 302, the battery cooling panel 100, and the second battery cell 304 within battery module subassembly 300 (illustrated by retention directional arrows 342). Battery module subassembly 300 may further include one or more gaskets 350 to maintain fluid seals within the battery module.

A manifold system 360 is in fluid communication with battery module subassembly 300 for moving coolant fluid into and out of the battery module subassembly 300. In one aspect, each cartridge frame member 320, 322 include a cartridge frame manifold 362,364 having an opening in communication with manifold system 360 for bringing coolant fluid into and out of battery cooling panel 100. In one mode of operation, coolant fluid flows from inlet manifold 370, into cartridge inlet manifold 372, and enters battery cooling panel 100 inlet channel endplate 130 where coolant fluid accesses the panel insert channels 108 for cooling battery cells 302,304. The coolant fluid moves through the battery cooling panel 100 channels 108, and exits the cooling panel 100 at outlet channel endplate 132 (not shown). Outlet channel endplate 132 is in fluid communication with cartridge outlet manifold where the coolant fluid exits the battery module via outlet manifold 374. Further, coolant fluid moves to additional battery modules via first frame member 320 and second frame member 322. Arrows illustrate a coolant fluid flow path through the battery module subassembly 300, at 384.

Figure 15:
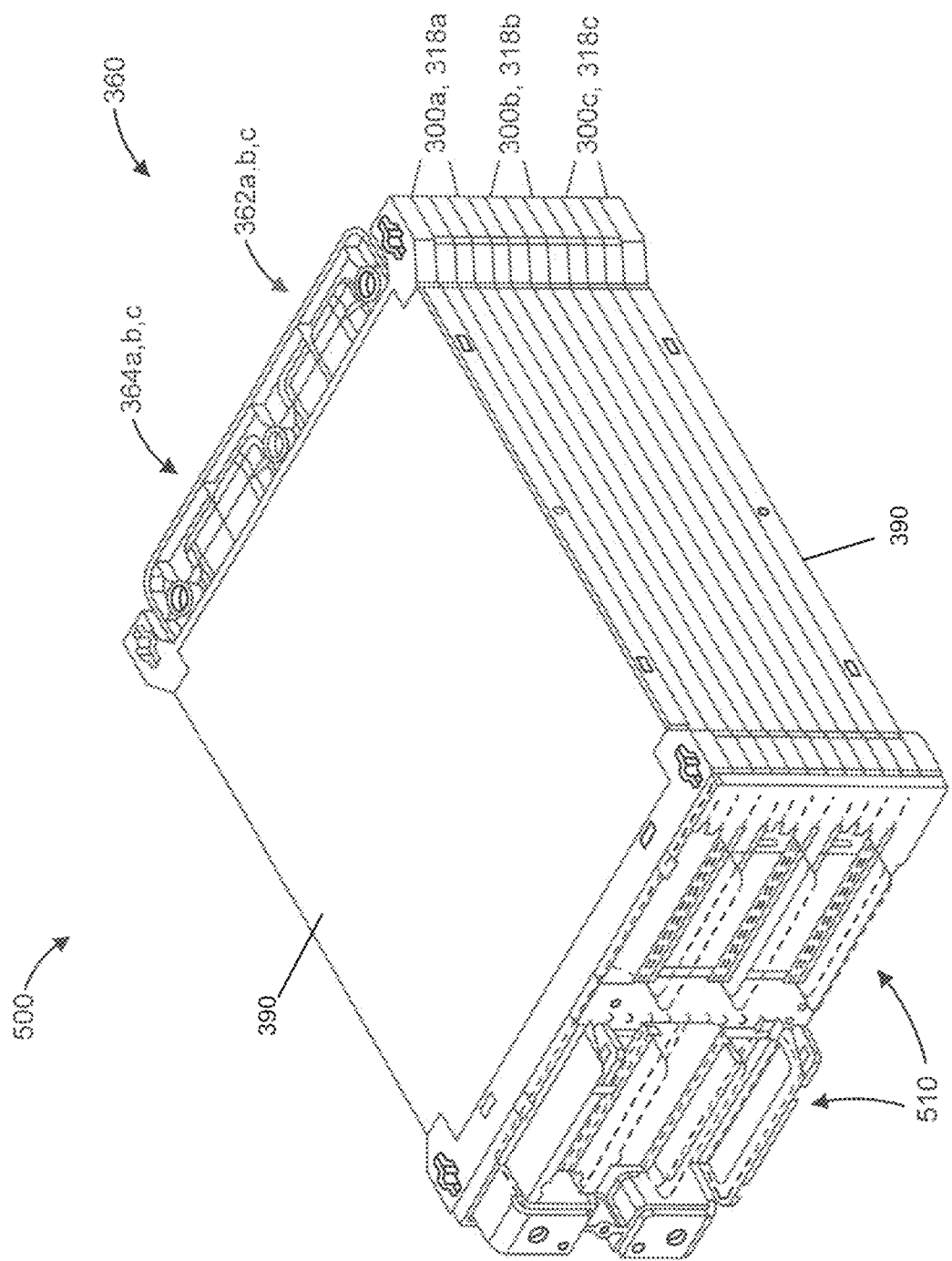
FIG. 15 is a perspective view illustrating one example of a battery stack.

FIG. 15 generally illustrates one example of a battery module 500 for use in an EV, such as electric snowmobile 10, where battery module 500 represents an example implementation of battery module 31 as illustrated by FIGS. 1 and 2. In some embodiments, one or more battery modules 500 may be implemented (e.g., stacked) to form battery stack 30. The battery module 500 includes multiple stacked battery module subassemblies 300a, 300b and 300c connected together via their cartridge assemblies 318a, 318b and 318c. The battery module 500 may also include covers, plates or caps 390 at either end to protect and compress the battery module subassemblies 300a, 300b and 300c there between. The manifold system 360 allows for coolant fluid to flow through the entire battery module 500 via the cartridge frame manifolds 362a,b,c and cartridge frame manifolds 364a,b,c. Battery connectors or electrodes in the form of blades 510 (positive and negative) are battery connection posts that extend from individual batteries located within the battery stack. The battery module 500 couples to an EV drivetrain via the battery connectors 510.

Figure 16:
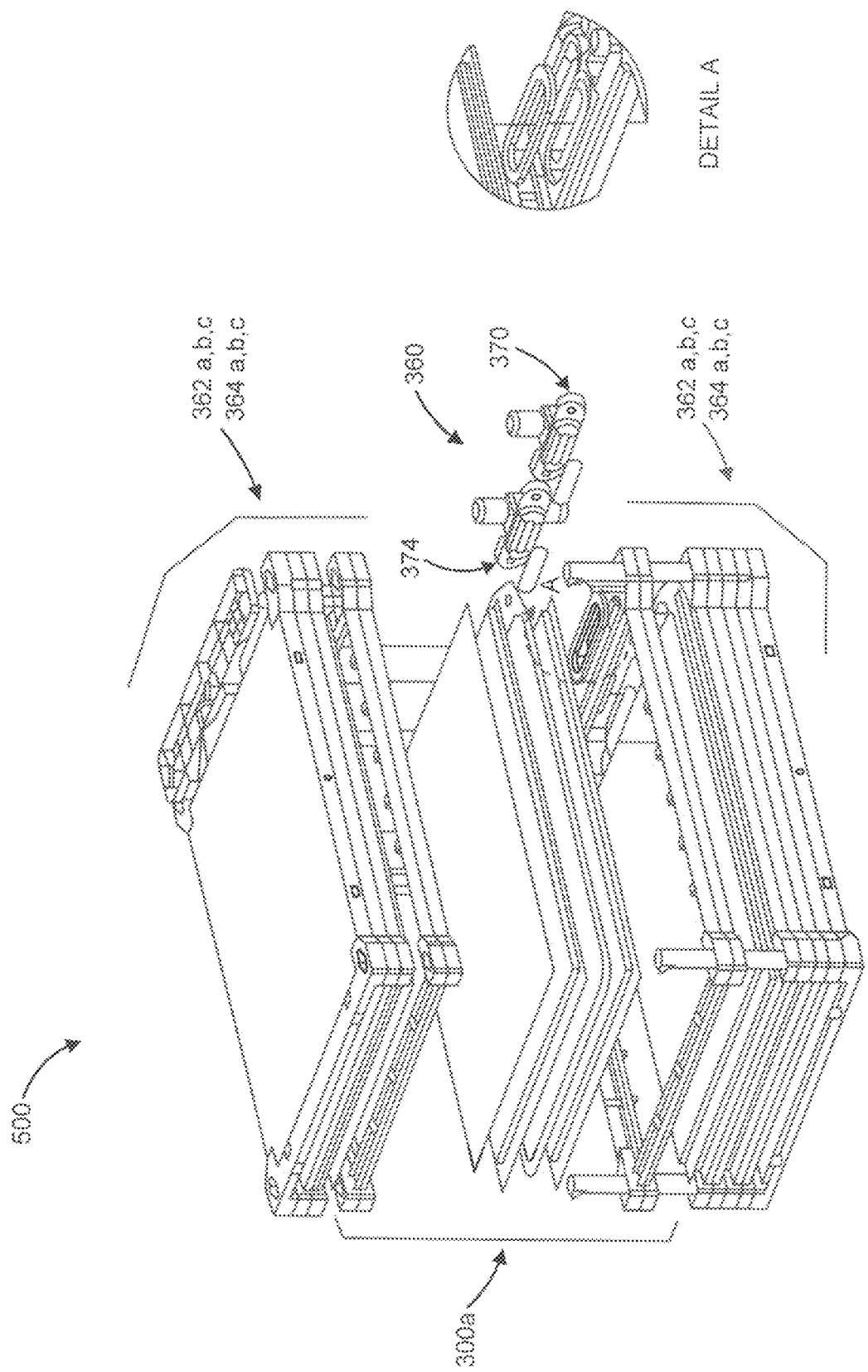
FIG. 16 is an exploded view illustrating one example of the battery stack of FIG. 13.

FIG. 16 is an expanded view of the battery module 500. As illustrated, a battery module subassembly 300a is illustrated as part of the module or stack. Further, manifold system 360 includes cartridge inlet manifold 370 and cartridge outlet manifold 374 in fluid communication with the cooling panels located within the battery module 500. In this example, only one cartridge inlet manifold 370 and one cartridge outlet manifold 372 is needed to provide coolant fluid flow to and from the entire battery module 500. Coolant liquid flow is provided in and out of the cooling panels via cartridge cooling manifolds 362a,b,c and 364a,b,c.

Figure 17:
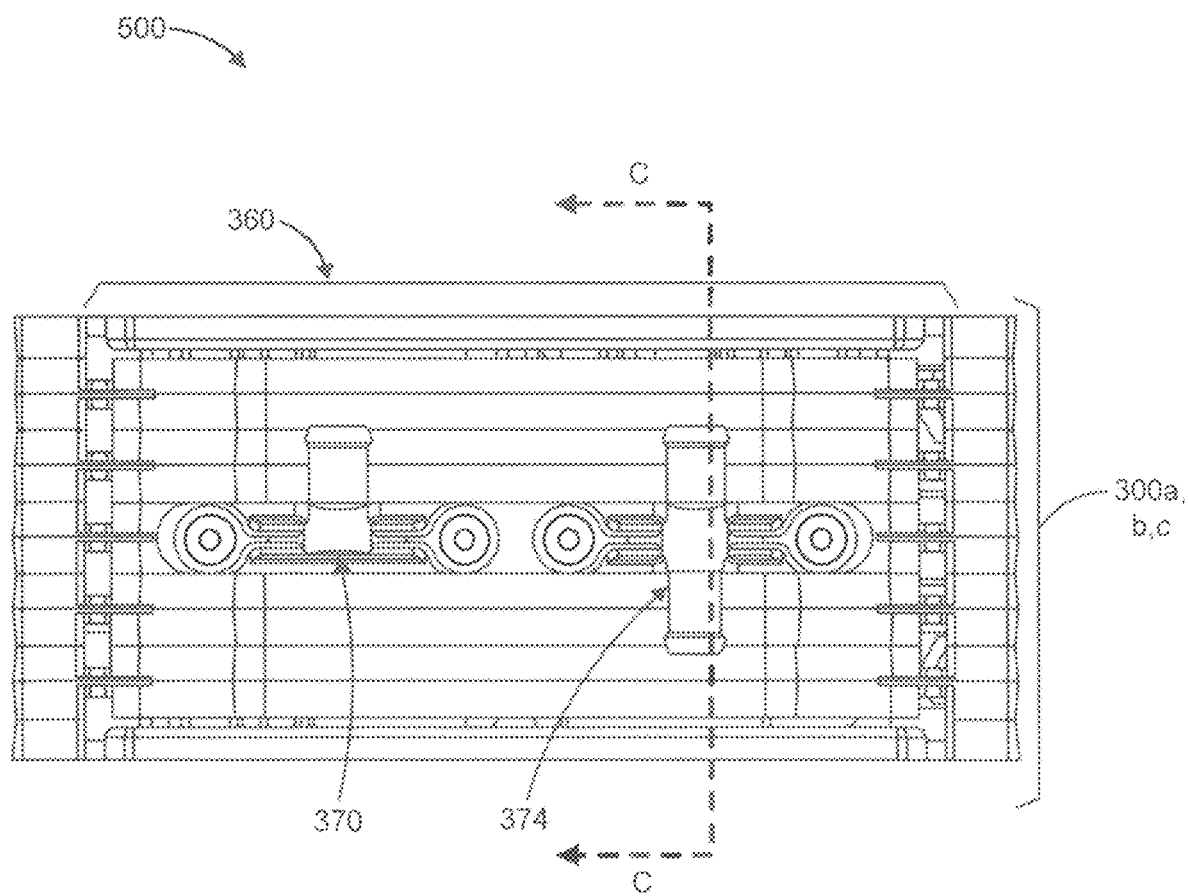
FIGS. 17-19 are enlarged cross-sectional views of a manifold system.
Figure 18:
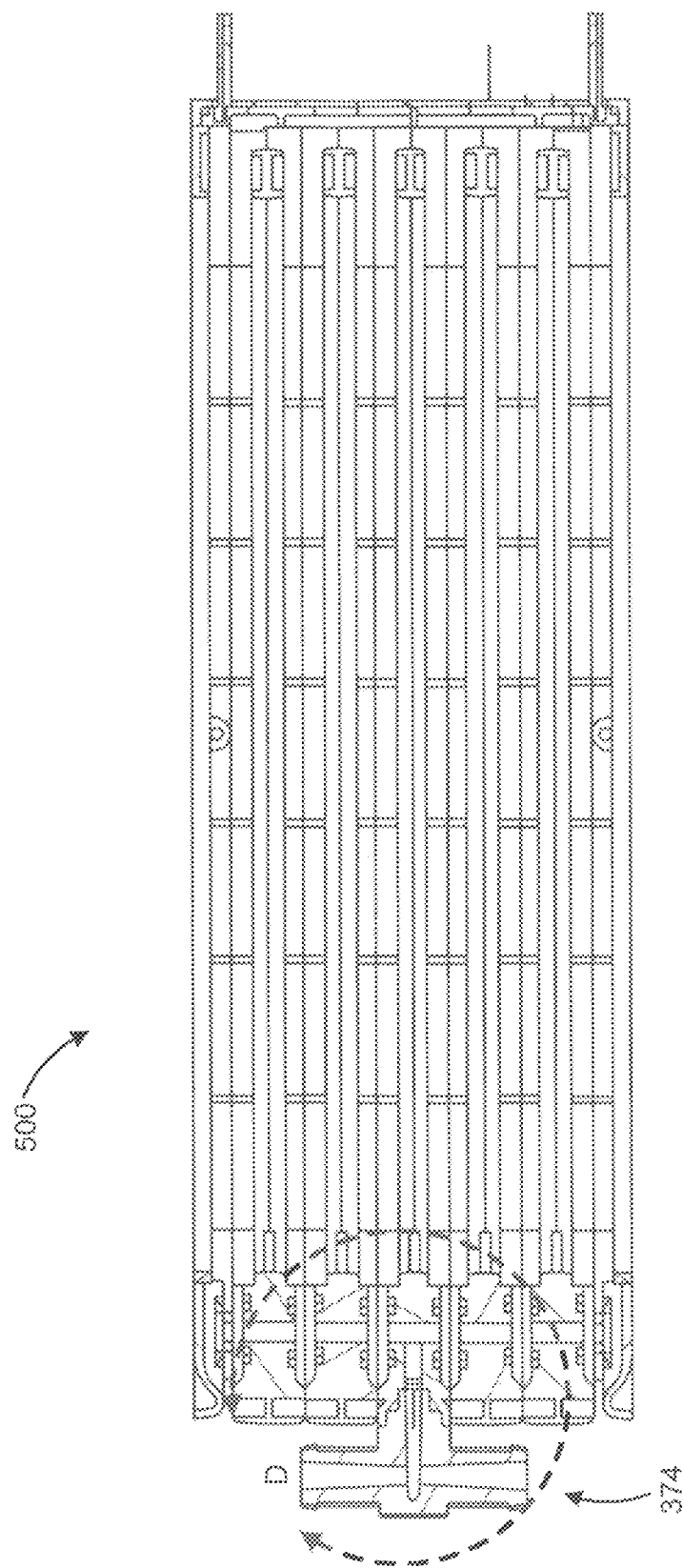
Figure 19:
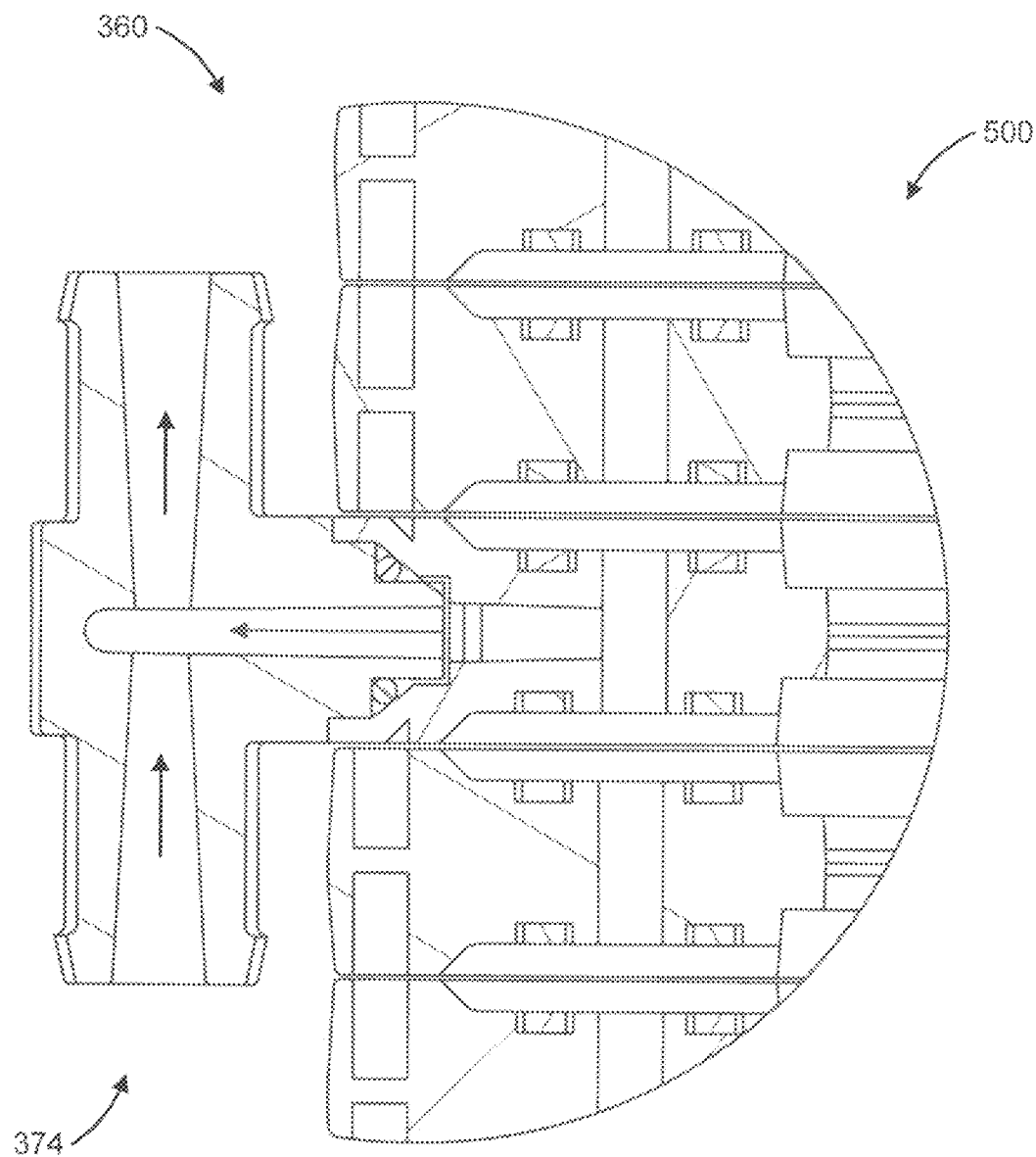

FIG. 17 is an end view of the battery module 500 illustrating the manifold system 360. FIG. 18 is a cross-section of the battery module 500 along line C-C of FIG. 15. FIG. 19 is an enlarged partial view of the manifold system 360 as the coolant fluid flow path enters battery module 500.

Figure 20:
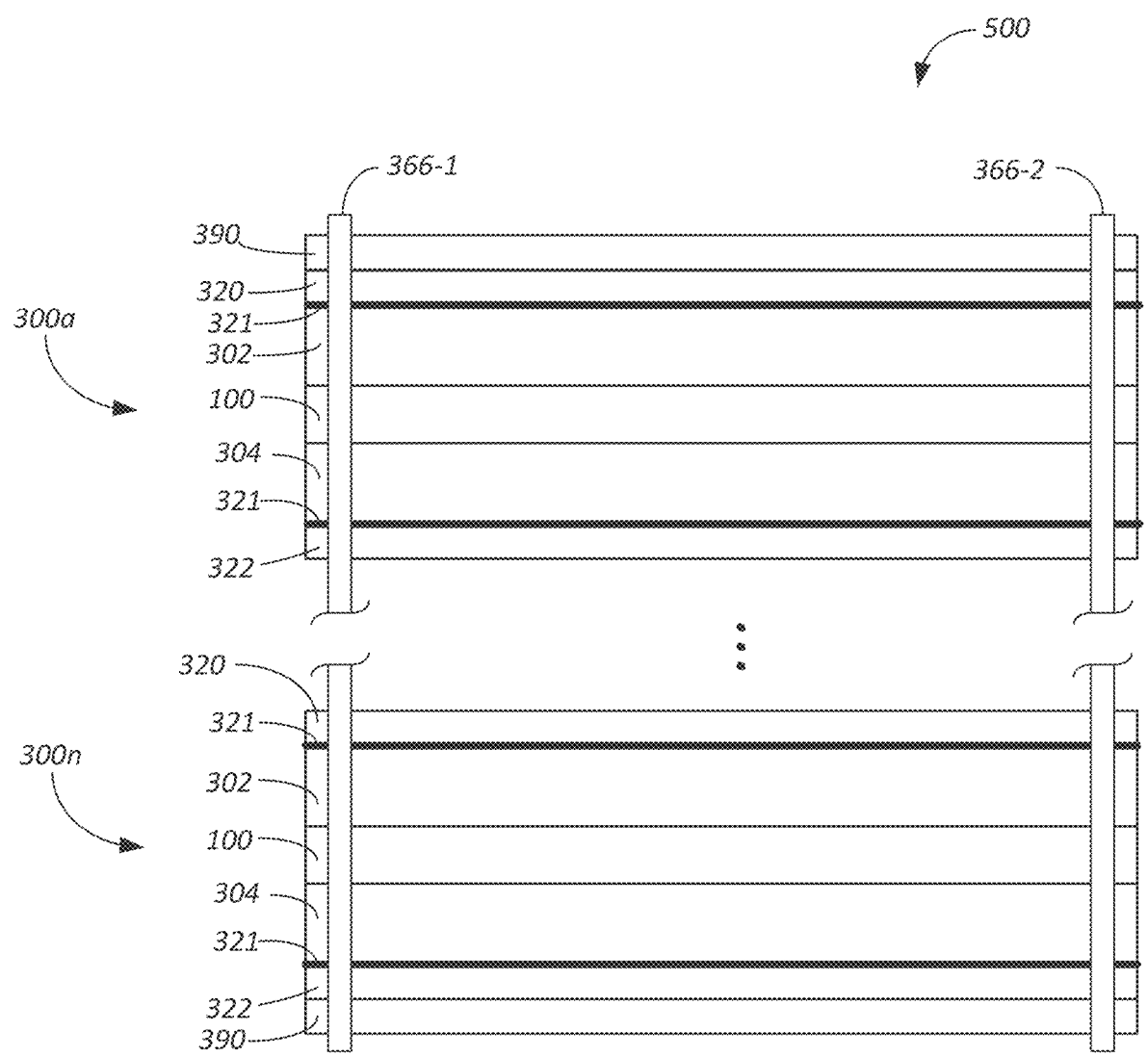
FIG. 20 is a block and schematic diagram generally illustrating a battery stack, according to one example.

FIG. 20 is a block and schematic diagram generally illustrating battery module 500, according to one example. According to one example, battery module 500 includes a number of battery module subassemblies 300, such as battery module subassemblies 300a to 300n, which are stacked and secured together via a number of frame retention elements 366, such as frame retention elements 366-1 and 366-2, which extend through frame members 320 and 322 of cartridge assembly 318 of each battery module subassembly 300. In examples, frame retention elements 366 (e.g., bars, rods, bolts, nuts, etc.) may extend through aligned openings 340 at each corner of battery module subassemblies 300 of battery module 500 (e.g., see FIGS. 14-16) and engage with the caps 390. In examples, frame retention elements 366 are tightened to draw the caps 390 together and compress battery module subassemblies 300 of battery module 500. In examples, frame retention elements 366 hold battery module subassemblies 300 and the components thereof (e.g., cooling panel 100 and battery cells 302 and 304) under a retention pressure, $P_R$, which holds battery cells 302 and 304 of battery module subassemblies 300 in direct contact with the corresponding cooling panel 100 to provide efficient heat transfer there between. In examples, battery module subassemblies 300 include foam layers 321 disposed between upper and lower frame members 320 and 322 and adjacent battery cells 302 and 304 to cushion contact there between.

The frame retention elements 366 provide an example of retention elements to apply a retention pressure to a battery stack including multiple cooling panels 100 and battery cells. Other examples are also contemplated. For example, frame retention elements may be provided external to a stack of multiple battery modules 500 to compress the battery modules 500 there between.

Lithium ion battery cells, such as battery cells 302 and 304, are subject to performance degradation (e.g., loss of capacity and decreased efficiency) with time and usage, where such degradation depends on a number of factors such as number of charge/discharge cycles, operating magnitude, operating temperature, an operating state-of-charge (SOC), and externally applied pressure. As described in greater detail below, during operation, lithium ion battery cells may change in thickness (e.g., expand or contract). While the change in thickness may be caused by multiple factors, such as operating temperature, for instance, the change is primarily influenced by the operating SOC where charging results in an expansion of battery cells electrodes and an initial formation of a solid electrolyte interface. If not constrained during operation, charging and discharging of the battery cells can cause separation and delamination of battery cell layers leading to performance degradation and decreased battery life.

Accordingly, frame retention elements 366 are configured to compress battery cells 302 and 304 between first and second frame members 320 and 322, and cooling panel 100, in order to maintain pressure on battery cells 302 and 304 and prevent delamination of cell layers. It has been shown that increased external pressure on lithium ion battery cells, such as battery cells 302 and 304, decreases expansion of battery thickness over the life of the battery cells and results in an extension of battery cell life. In some embodiments, a pressure of 5 pounds per square inch (psi) or more across a battery cell may be sufficient to extend battery cell life. In other embodiments, a pressure greater than 5 psi (e.g., 10, 15, 20 or 50 psi) may be implemented to help further extend battery cell life.

Figure 21:
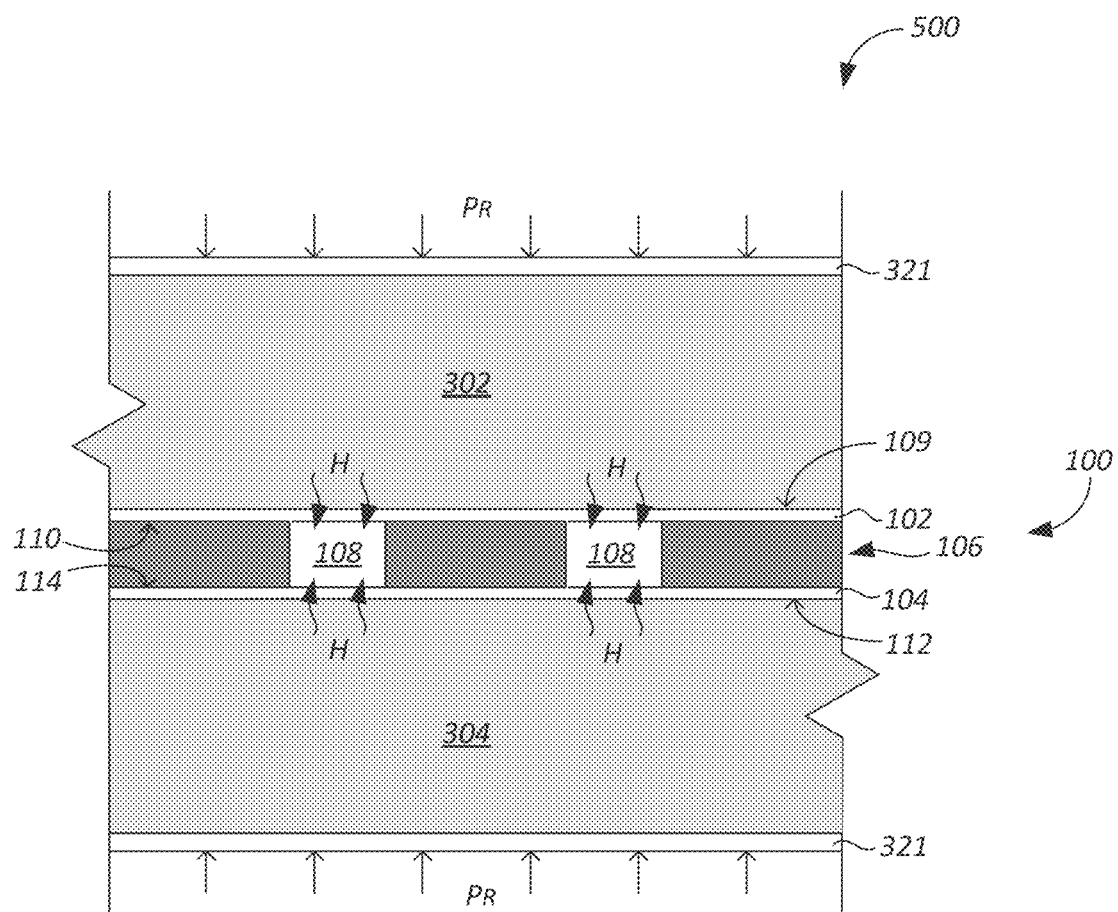
FIG. 21 is a block and schematic diagram generally illustrating a cross-sectional view of a portion of a battery module of a battery stack, according to one example.

FIG. 21 is a block and schematic diagram generally illustrating a cross-sectional view of a portion of battery module 500 of a battery stack, according to one example. Retention pressure, $P_R$, exerted by frame retention elements 366 (see FIG. 22) respectively forces battery cells 302 and 304 against the exterior surfaces 109 and 112 of first and second outer panels 102 and 104 of cooling panel 100. In addition to constraining battery cells 302 and 304 to decrease expansion, such pressure also acts to ensure close and uniform contact between battery cells 302 and 304 and the thin and flexible first and second outer panels 102 and 104 and thereby provide highly effective heat transfer, H, from battery cells 302 and 304 to coolant fluid (e.g., glycol) being circulated through cooling flow channels 108.

In examples, as illustrated, cooling flow channels 108 are rectangular in shape with a first set of opposing interior sidewalls formed by panel insert 106, and a second set of opposing sidewalls, which are in contact with battery cells 302 and 304, being formed by the interior surfaces 110 and 114 of first and second outer panels 102 and 104 of cooling panel 100. In other examples, cooling flow channels may have cross-sectional shapes other than rectangular.

Figure 22:
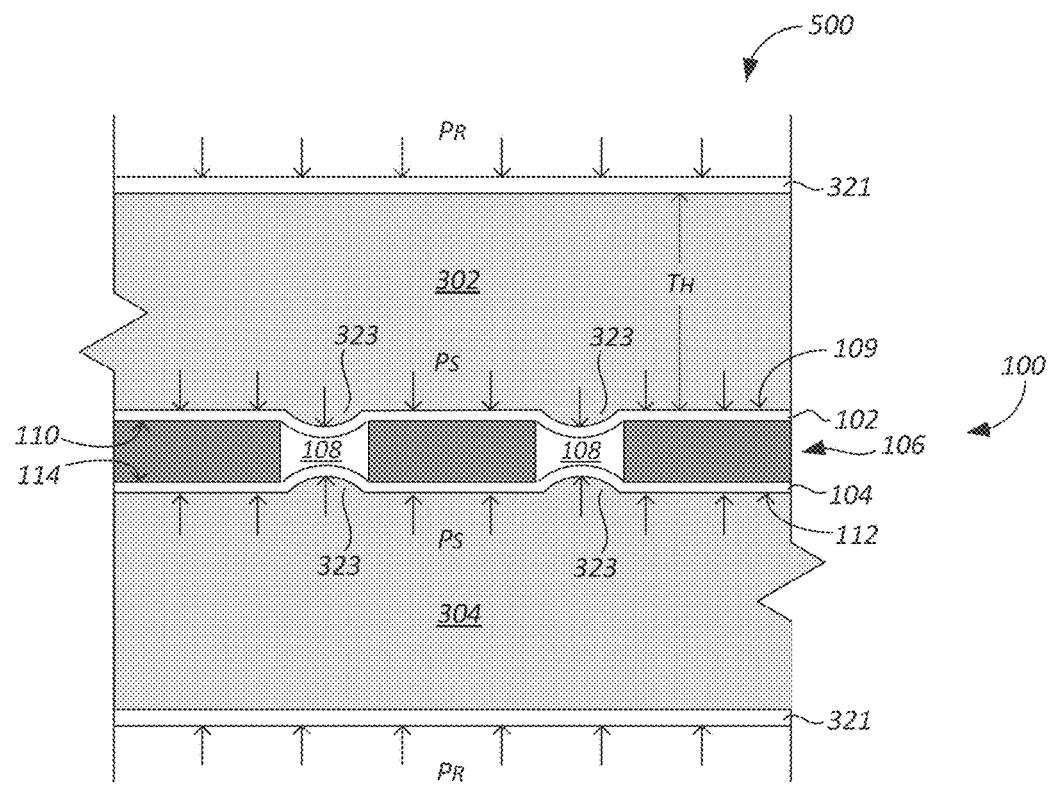
FIG. 22 is a block and schematic diagram generally illustrating a cross-sectional view of a portion of a battery module of a battery stack, according to one example.

FIG. 22 is a block and schematic diagram generally illustrating a cross-sectional view of a portion of battery module 500, according to one example. Along with retention pressure, $P_R$, exerted by frame retention elements 366 drawing together the components of battery module 500 (e.g., see FIG. 21), a number of additional compressive pressure sources may be present to combine with retention pressure, $P_R$, to produce a stack pressure, $P_S$, exerted on cooling panels 110. Such additional pressures sources may include volumetric expansion of battery cells 302 and 304, and expansion of ambient air that may be present between battery cells 302 and 304 and cooling panel 100, for example. As illustrated, such stack pressure, $P_S$, is exerted on exterior surfaces 109 and 112 of first and second outer panels 102 and 104 of cooling panel 100.

While the lightweight and non-rigid construction of cooling panel 100 is beneficial to reduce the weight of battery module 300, to achieve high levels of surface contact with battery cells 302 and 304, and to provide effective heat transfer between battery cells 302 and 304 and coolant fluid in coolant flow channels 108 (i.e., low thermal resistance), such lightweight construction may result in first and second outer panels 102 and 104 being deformable. In some cases, if stack pressure, $P_S$, exceeds a resistance of panels 102 and 104 to such deformation, the non-rigid first and second outer panels 102 and 104 may deflect and partially collapse into coolant flow channels 108. Such collapse would act to reduce the volume of coolant flow channels 108 (i.e., via a reduction in cross-sectional area) and cause an increases in pressure drop across cooling panel 100 which, in-turn, would reduce a volume of coolant flow through channels 108 and thereby reduce the effectiveness of cooling panel 100 to remove heat from battery cells 302 and 304.

As mentioned above, in addition to retention pressure, $P_R$, exerted by frame retention elements 366, pressure resulting from volumetric expansion of battery cells 302 and 304 may also contribute to, and increase the stack pressure, $P_S$, acting on cooling panels 100. As also mentioned above, during operation, the SOC (state of charge) of battery cells 302 and 304 is a primary influence on battery cell expansion.

During operation, electrical charging and discharging of battery cells 302 and 304 causes movement of lithium ions across a separator between an anode and cathode of the battery cells. In particular, during charging, an applied external voltage potential forces lithium ions to move across the separator from the metal oxide cathode to the graphite anode. The lithium ions bind to the graphite anode forming $Li_xC_6$, which increases the size of the anode and, thus, the overall volume of the battery cell, including its thickness, $T_H$. In examples, it has been found that when battery cells are constrained along their lateral sides but not in the direction of thickness, during charging, the thickness, $T_H$, of battery cells 302 and 304 may potentially increase by as much as 1.6% when the state of charge is increased from 15% to 95% of charge capacity.

While not to the same degree, battery cell operating temperature has also been found to affect the thickness of battery cells 302 and 304, with cell thickness, $T_H$, increasing with increased temperature. In examples, it has been found that, at increased temperature, cell thickness, $T_H$, may vary by as much as 0.2%, which may also contribute to stack pressure, $P_S$.

As illustrated by FIG. 22, during operation, if not constrained, the thickness, $T_H$, of battery cells 302 and 304 may increase and cause portions of battery cells 302 and 304 to deform and may cause corresponding portions of first and second outer panels 102 and 104 to partially collapse into flow channels 108, as illustrated at 323. In addition to potential thermal damage resulting from reduced coolant fluid flow through flow channels 108 caused by the partial collapse of coolant flow channels 108, as mentioned above, expansion (and contraction) of battery cells 302 and 304 into flow channels 108 over time can lead to structural degradation of battery cells 302 and 304 (e.g., delamination of cell layers) and shorten cell life.

Figure 23:
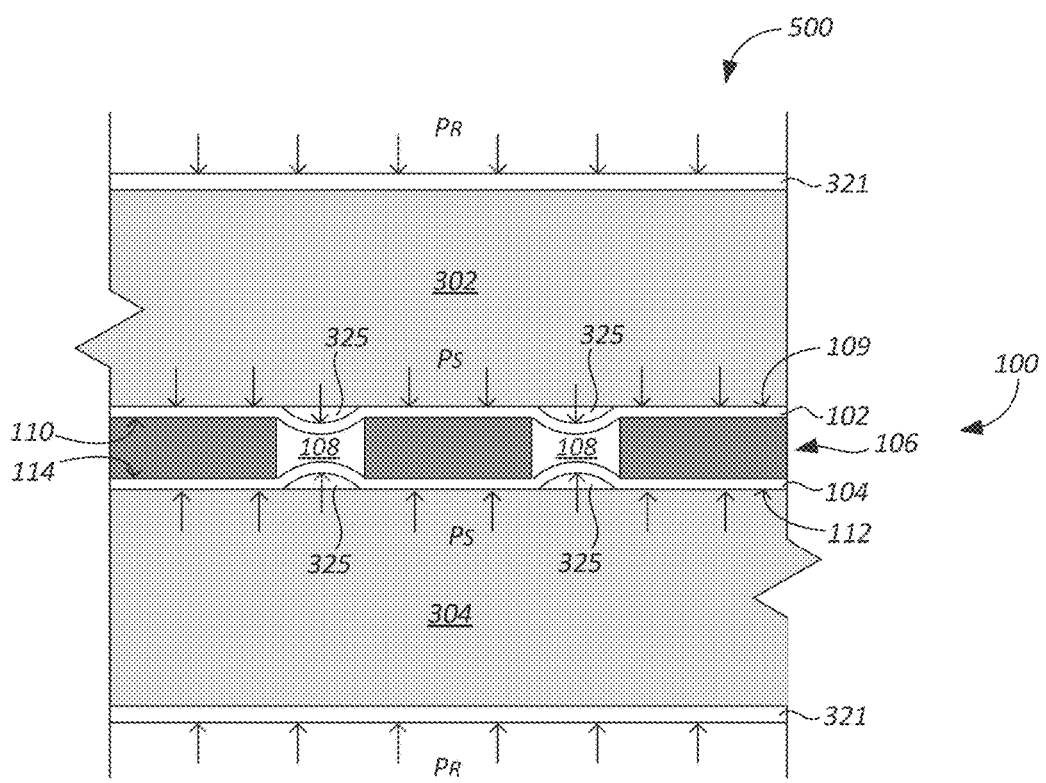
FIG. 23 is a block and schematic diagram generally illustrating a cross-sectional view of a portion of a battery module of a battery stack, according to one example.

With reference to FIG. 23, even if battery cells 302 and 304 do not expand during operation, coolant flow channels 108 may still potentially be collapsed due to ambient air that may be trapped between battery cells 302 and 304 and first and second outer panels 102 and 104 during assembly of battery modules 500 and battery stacks. During operation of battery pack 14 (see FIG. 1), such trapped air may expand due heat produced by operation of battery cells 302 and 304, and/or may be compressed by increases in thickness, $T_H$, of battery cells 302 and 304, resulting in an increase in the pressure of the trapped air being exerted on first and second outer panels 102 and 104. As illustrated at 325 in FIG. 23, if great enough, such air pressure may cause first and second outer panels 102 and 104 to deform and partially collapse coolant flow channels 108 thereby resulting in coolant fluid volume and coolant fluid flow issues within cooling panels 100, as described above.

Due to variations in construction tolerances between battery modules 500 and battery stacks 30 (e.g., variances in materials and component dimensions, electrical operation differences of battery cells, and different amounts of compression applied by frame retention elements 366, for instance), the amount of stack pressure, $P_S$, experienced by different cooling panels 100 of a same module 500, and by cooling panels 100 of modules 500 in different battery stacks 30 may vary. Such variance in stack pressure, $P_S$, may result in different battery modules 500 and/or battery stacks 30 of a same battery pack (such as battery pack 14 of FIG. 1) experiencing different amounts of collapse of cooling flow channels 108 within cooling panels 100 and at different locations within the battery stack 30.

As a result, in addition to partial collapses of cooling channels 108 causing localized restriction of coolant fluid flow and localized thermal issues, such collapses can result in pressure differences in coolant fluid flow between battery modules 500 within a same battery stack 30, and between different battery stacks 30 of a same battery pack 14. For example, within battery pack 14, a stack pressure, $P_S$, on a first cooling panel 100 of first battery module 500 in a first battery stack 30 may be greater than a stack pressure, $P_S$, on a second cooling panel 100 of a second battery module 500 of a second battery stack 30 (e.g., between battery stacks 30-1 and 30-n of battery pack 14 of FIG. 1). Such pressure differences can result in uneven flow of coolant fluid between different battery stacks 30, and between different battery modules 500 of a given battery stack 30, thereby resulting in uneven temperature control and performance differences between battery modules 300 throughout battery pack 14 and potential shortening of an expected operational life of battery pack 14. Uneven temperature control for battery pack 14 may also limit operation of electric snowmobile 10, as one battery module 500 or even one battery cell that is overheating may limit the amount of power that can be safely drawn from the entire battery pack 14.

Figure 24:
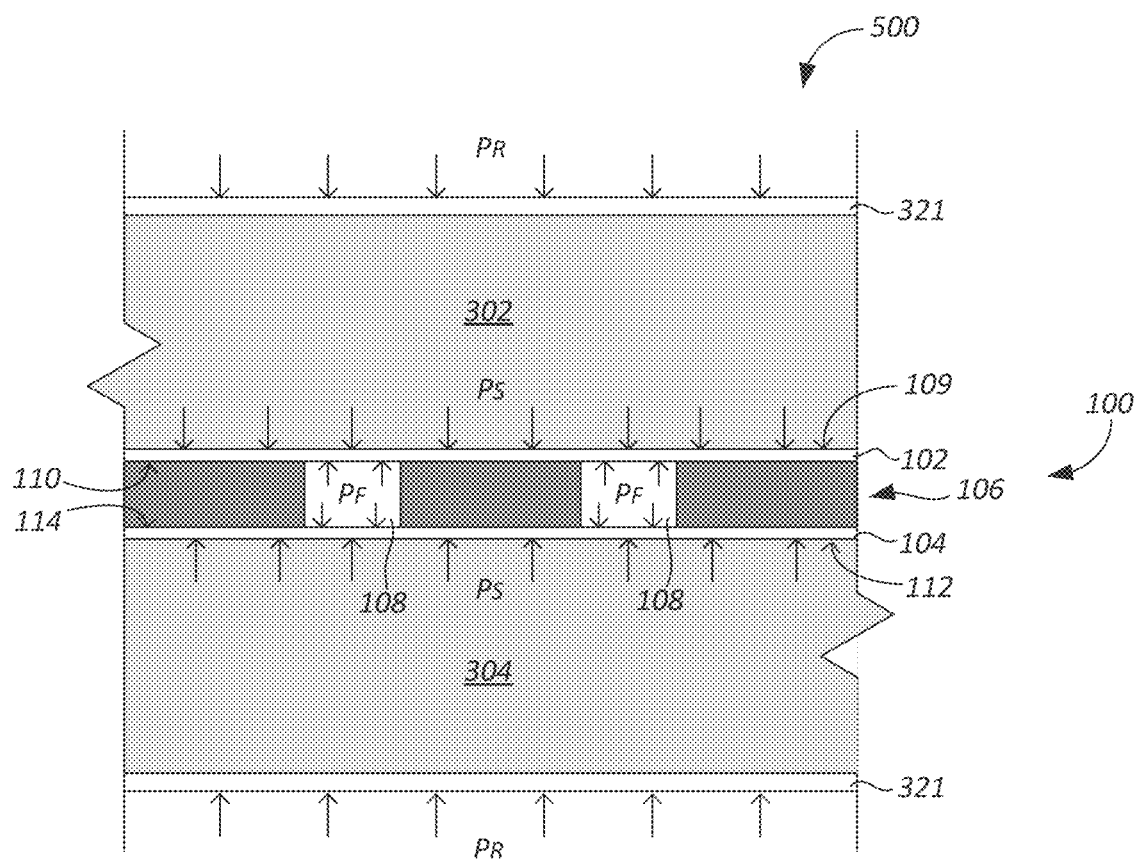
FIG. 24 is a block and schematic diagram generally illustrating a cross-sectional view of a portion of a battery module of a battery stack, according to one example.
Figure 25:
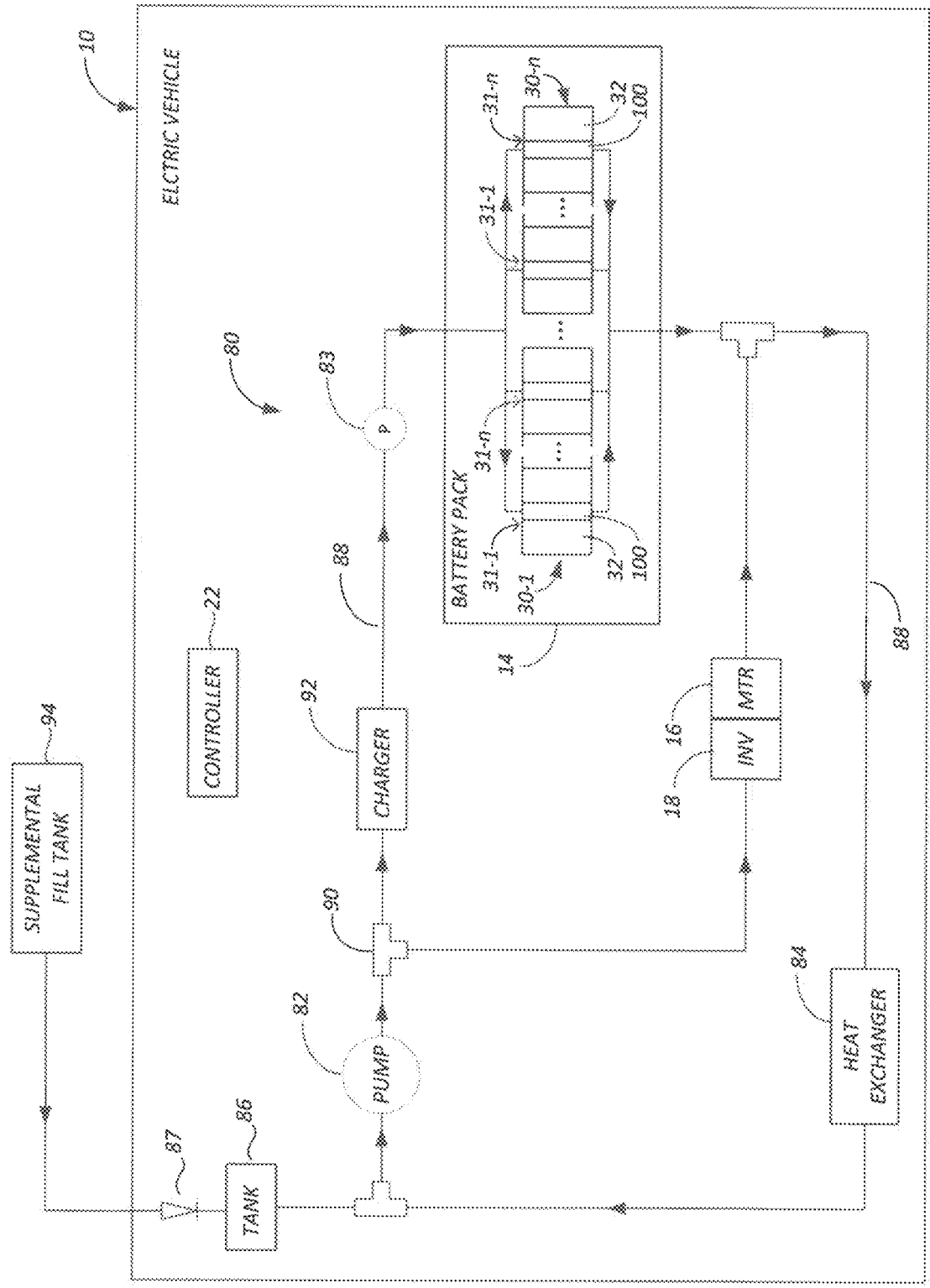
FIG. 25 is a block and schematic diagram generally illustrating a thermal management system, according to one example.

With reference to FIGS. 24 and 25, in accordance with examples of the present disclosure, to eliminate the potential collapse of cooling flow channels 108, thermal management system 80 is operated so as to maintain coolant fluid within coolant flow channels 108 at a fluid pressure, $P_F$, which is greater than or equal to the stack pressure, $P_S$, expected to be experienced by at least some coolant panels 100 of battery modules 300 and battery stacks 500 during operation of the electric vehicle, such as electric snowmobile 10. By maintaining the fluid pressure, $P_F$, of coolant fluid at such level, the coolant fluid acts as a structural element to prevent the collapse of first and/or second outer panels 102 and 104 into cooling flow channels 108 due to stack pressure, $P_S$. In one example, the fluid pressure, $P_F$, of coolant fluid within cooling flow channels 108 is maintained at a pressure level which greater than or equal to the greatest stack pressure, $P_S$, expected to be present at any location within battery pack 14 (i.e., a so-called maximum stack pressure, $P_{SMAX}$, expected to be present on any cooling panel 100 within battery pack 14). In some examples, the fluid pressure, $P_F$, is greater than or equal to 5 psi. In some examples, the fluid pressure, $P_F$, is greater than or equal to 10 psi. In some examples, the fluid pressure, $P_F$, is greater than or equal to 15 psi. In some examples, the fluid pressure, $P_F$, is greater than or equal to 20 psi. Other examples of the fluid pressure, $P_F$, are also contemplated.

With reference to FIG. 25, in accordance with the present disclosure, thermal management system 80 may employ a number of techniques for maintaining the fluid pressure, $P_F$, of coolant fluid within cooling flow channels 108 of cooling panels 100 at a pressure level greater than or equal to a maximum expected stack pressure, $P_{SMAX}$. One such technique is to operate pump 82 at a speed (or duty cycle) required to generate a fluid pressure within cooling flow channels 100 greater than $P_{SMAX}$. However, if a volume of coolant fluid within thermal management system is too low (e.g., if tank 86 is too small), then pump 82 may be unable to generate fluid pressure at pressure greater than $P_{SMAX}$. For example, operating pump 82 at a speed required to generate a fluid pressure within cooling flow channels 100 greater than $P_{SMAX}$ may require a volume of coolant fluid greater than the volume of tank 86. While the volume of tank 86 may be increased to provide the necessary coolant fluid volume in some embodiments, this would increase the size and weight of tank 86, which may be particularly undesirable in powersport vehicles such as snowmobiles.

With this in mind, another technique for achieving a fluid pressure at or greater than $P_{SMAX}$ is directed to achieving a desired volume or fill level of coolant fluid within thermal management system 80, such as within the fluid pathways 88, coolant flow channels 108, and fluid pathways within other components of electric vehicle 10 (e.g., within motor 16, inverter 18, charger 92, and heat exchanger 84, for instance) to enable pump 82 to create increased levels of fluid pressure. Such process may sometimes be referred to herein as an "overfill" process.

Cooling systems employing rigid fluid pathways may be filled under a vacuum so that expansion space for fluid within the system after filling is minimized. However, because the walls of coolant flow channels 108 could be flexible (not rigid), thermal management system 80 might not be filled under a vacuum as such a process may collapse the flexible walls of coolant flow channels 108. Instead, thermal management system 80 may be filled under pressure through operation of pump 82.

According to one example of such a process, tank 86 is filled with coolant fluid, and pump 82 is operated to pressurize thermal management system 80 and draw coolant fluid from tank 86 into fluid pathways 88, including cooling flow channels 108 of cooling panels 100. However, as coolant fluid is drawn from tank 86 into fluid pathways 88, an empty volume is created within tank 86, where such empty volume reduces an amount of pressure that can be created by pump 82 during operation. As a result, during operation of electric vehicle 10, pump 82 may be unable to generate an operating fluid pressure, $P_F$, greater than or equal to $P_{SMAX}$, and, thus, be unable to prevent a partial collapse of cooling flow channels 108 or be unable to force partially collapsed walls of cooling flow channels 108 back to their intended shape. Furthermore, even if sufficient fluid pressure, $P_F$, is able to be generated when pump 82 is operating, when pump 82 is not operating (e.g., when electric vehicle 10 is turned off), a static fluid pressure in thermal management system 80 may not be sufficient to prevent a partial collapse of cooling flow channels 108.

An inability to maintain and/or achieve fluid pressure, $P_F$, at a level greater than or equal to $P_{SMAX}$ and thereby prevent a partial collapse of cooling flow channels 108 may result problems described above (e.g., battery cell deformation, uneven cooling, etc.). Additionally, repeated flexing of portions of first and second outer panels 102 and 104 forming walls of cooling flow channels 108 between design and collapsed positions when pump 82 is turned on and off may cause wear of the material of panels 102 and 104.

According to examples of an overfilling process, as described herein, thermal management system 80 is filled with coolant fluid in a fashion to reduce empty volume therein so as to enable pump 82 to create increased operational fluid pressure when running and to enable thermal management system 80 to maintain an increased static fluid pressure when pump 82 is not running. In some examples, such static fluid pressure may be between 5-10 psi. In some examples, such static fluid pressure may be at levels greater than or equal to $P_{SMAX}$. As such, according to some examples, even with pump 82 not running, thermal management system 80 maintains the coolant fluid at a fluid pressure, $P_F$, to prevent collapse of cooling flow channels 108.

With reference to FIG. 25, according to one example, thermal management system 80 includes a relief valve 87 disposed upstream of primary coolant tank 86, where relief valve 87 may enable fluid to flow into, but not out of, tank 86 (i.e., a check valve). However, relief valve 87 may also enable fluid to flow out of tank 86 when a sufficiently high pressure is reached inside of tank 86 (e.g., 16 psi). This ability to relieve high pressure in tank 86 may prevent damage to thermal management system 80. During a filling process, primary coolant tank 86 is filled with an initial volume of coolant fluid. Subsequently, a supplementary coolant tank 94, which is separate from and external to electric vehicle 10, is attached to primary coolant tank 86 via relief valve 87. Thereafter, pump 82 is operated to pressurize thermal management system 80, including pressurizing battery pack 14, and to draw cooling fluid from primary coolant tank 86 into the fluid pathways 88 (including cooling panels 100). Coolant fluid may be drawn from primary coolant tank 86 as it is located downstream of, and adjacent to, the low-pressure inlet of pump 82. In some embodiments, valves 90 may be cycled (e.g., open and closed in predetermined patterns) while pump 82 is operating to ensure that each component of thermal management system 80 is pressurized with coolant fluid and to reduce the amount of trapped air inside the thermal management system 80.

As coolant fluid is drawn into fluid pathways 88, coolant fluid is drawn into primary coolant tank from supplementary coolant tank 94 via relief valve 87 to replace the volume of fluid drawn from primary coolant tank 86, with relief valve 87 preventing coolant fluid from flowing back into supplementary coolant tank 94. In this way, thermal management system 80 is filled with a volume of coolant fluid greater than the volume of tank 86. Further, thermal management system 80 may be filled with the volume of coolant fluid that provides a certain pressure in the fluid channels. This avoids having to select a fixed amount of coolant fluid for thermal management system 80 and allows for variations in different components of the thermal management system 80 to be passively managed. For example, different implementations of thermal management system 80 may each draw a volume of additional coolant fluid from supplementary coolant tank 94 corresponding to variations in their size and design, rather than being provided with a fixed amount of coolant fluid that might not account for the variations between the different implementations.

Upon thermal management system 80 being filled with coolant fluid, supplementary coolant tank 94 is disconnected from relief valve 87 with the result being that primary tank 86 is filled with approximately a same volume of coolant liquid as the initial volume of coolant fluid, thereby preventing an increase in an empty volume of air within primary coolant tank 86 during the filling process. As a result, during operation, pump 82 to able to circulate coolant fluid at a fluid pressure, $P_F$, which exceeds the maximum stack pressure, $P_{SMAX}$, such that the coolant fluid supports and prevents the flexible walls of cooling flow channels 108 of cooling panels 100 from collapsing due to the compressive stack pressure, $P_S$.

Primary tank 86 being filled with additional coolant fluid from supplementary coolant tank 94 when pump 82 is operating may prevent some backflow of coolant fluid into tank 86 when pump 82 is turned off. As a result, coolant fluid remains in fluid channels 108 of cooling panels 100, which provides a static fluid pressure, $P_F$, to maintain fluid channels 108 in their intended shape and also increase the pressure on battery cells. In some examples, the coolant fluid is a non-compressible fluid to provide the static fluid pressure, $P_F$. On the other hand, any air trapped within the thermal management system 80 (e.g., within the cooling flow channels 108 of cooling panels 100) is compressible. The fluid pressure, $P_F$, may compress the trapped air. Benefits of compressing the trapped air include improving the ability of the air to flow through the cooling flow channels 108 as the air will be compressed into a smaller volume, and reducing the effective total volume of air trapped within the thermal management system 80.

The supplementary coolant tank 94 is an example of a supplementary coolant source. Other examples of a supplementary coolant source include a funnel capable of having additional coolant fluid added during the overfilling process.

In examples, a value of $P_{SMAX}$ of thermal management system 80, and in particular for battery pack 14, is a known expected value determined during design and manufacture of electric vehicle 10. In one example, during operation of electric vehicle 10, pump 82 is operated at a fixed rotational speed and/or duty cycle to create a fluid pressure of cooling fluid within thermal management system 80 that is at least equal to $P_{SMAX}$. In one example, pump 82 is operated at a fixed rotational speed and/or duty cycle to create a fluid pressure of cooling fluid within thermal management system 80 that is greater than $P_{SMAX}$. In one example, pump 82 is operated at a fixed rotational speed and/or duty cycle to create a fluid pressure of cooling fluid within thermal management system 80 that is greater than $P_{SMAX}$ by a predetermined percentage, such as at 150% of $P_{SMAX}$. As an example, if $P_{SMAX}$ has been determined to be approximately 5 pounds per square inch (psi), for instance, a size, duty cycle and operational speed (rpm) of pump 82 may be selected to generate and circulate the coolant fluid at a fluid pressure, $P_F$, of 10 psi. In other examples, $P_{SMAX}$ and the operating fluid pressure, $P_F$, of the coolant pressure generated by pump 82 may have any number of values.

In other examples, in lieu of operating pump 82 at a predetermined fixed speed and/or duty cycle, a pressure gauge 83 is disposed in fluid pathway 88 at an inlet to battery pack 14, wherein controller 22 (see FIG. 1) adjusts an operating speed and/or duty cycle of pump 82 based on a pressure value provided by pressure gauge 83 to maintain the coolant fluid at a fluid pressure, $P_F$, at a selected pressure level which is at least equal to $P_{SMAX}$.

By operating to maintain a fluid pressure, $P_F$, of coolant fluid at a pressure level greater than or equal to a greatest expect stack pressure, $P_{SMAX}$, thermal management system 80, in accordance with the present disclosure, eliminates the potential collapse of cooling flow channels 108 within cooling panels 100. Maintaining cooling flow channels 108 at their full volume enables unobstructed and unrestricted flow of cooling fluid through cooling panels 100 to thereby provide efficient and uniform cooling of battery cells 302 and 304 throughout battery pack 14 and eliminate thermal degradation of battery cells 302 and 304 caused by overheating and uneven temperature distribution. Additionally, maintaining the fluid pressure, $P_F$, of coolant fluid within flow channels 108 at such pressure levels also maintains battery cells 302 and 304 at such pressure levels to thereby reduce potential cell expansion and associated structural degradation (e.g., cell layer delamination). Accordingly, maintaining a fluid pressure, $P_F$, of coolant fluid at a pressure level greater than or equal to a greatest expect stack pressure, $P_{SMAX}$, thermal management system 80, in accordance with the present disclosure, extends an operating life of battery cells 302 and 304 and, thus, an operating life of battery pack 14.

In some embodiments, the configuration of the thermal management system 80 (as shown in FIGS. 2 and 25, for example) may help increase coolant fluid pressure in the battery pack 14, and thereby increase coolant fluid pressure in fluid channels 108 of cooling panels 100. For example, battery pack 14 may be positioned relatively close to the high-pressure outlet of pump 82, which may provide a relatively high fluid pressure at the inlet to battery pack 14. In the illustrated example, battery pack 14 is positioned downstream of the outlet of pump 82 and upstream of the inlet of heat exchanger 84 in the first fluid circulation loop (i.e., between the outlet of pump 82 and the inlet of heat exchanger 84). This configuration may increase pressure in battery pack 14 as the pressure drop across heat exchanger 84 occurs downstream of battery pack 14.

Figure 26:
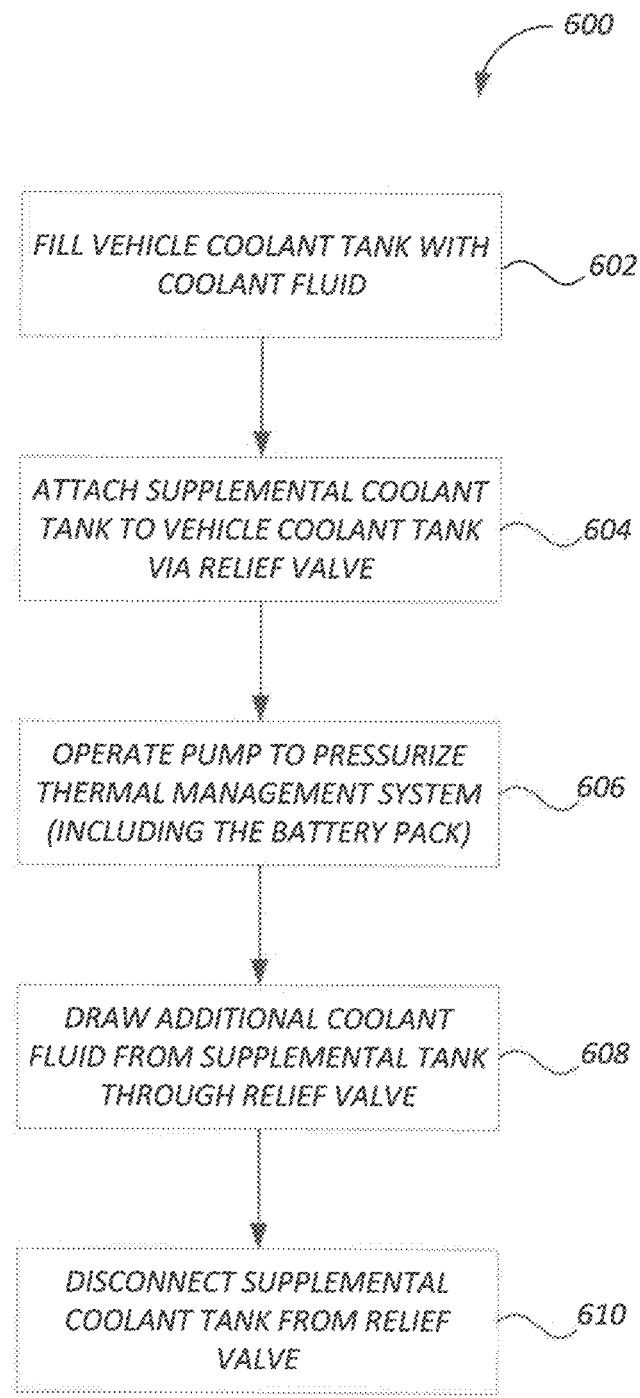
FIG. 26 is a flow diagram generally illustrating a method of operating a thermal management system, according to one example.

FIG. 26 is a flow diagram generally illustrating a process 600 of operating an electric vehicle comprising filling a pressurized thermal management system 80 with coolant fluid, sometimes referred to as an "overfilling" process, according to one example of the present disclosure, such as described above with respect to FIG. 25. Process 600 begins at 602 with filling a primary coolant tank of a thermal management system of the electric vehicle with coolant fluid, such as filling primary coolant tank 86 thermal management system 80 of electric snowmobile 10 of FIG. 26 with coolant fluid. At 604, process 600 includes attaching a supplementary coolant tank (or, more generally, a supplemental coolant source) to the primary coolant tank of the electric vehicle, where the supplemental coolant tank is separate from and external to the electric vehicle, such as attaching external supplementary coolant tank 94 to primary coolant tank 86, as illustrated by FIG. 26. In one example, attaching supplementary coolant tank 94 includes attaching supplementary coolant tank 94 to primary coolant tank 86 via a one-way valve (e.g., a check valve), such as illustrated by valve 87 of FIG. 26.

At 606, process 600 includes operating a coolant pump of the thermal management system to pressurize the thermal management system, including pressurizing cooling panels of a battery pack of the electric vehicle, and to draw coolant fluid from the primary coolant tank into fluid pathways of the thermal management system, such as operating pump 82 of thermal management system 80 of FIG. 26 to pressurize and draw coolant fluid from primary coolant tank 86 into fluid pathways 88 (including cooling panels 100 of battery pack 14). At 608, as coolant fluid is drawn from the primary tank, process 600 includes drawing coolant fluid from the supplementary coolant tank into the primary coolant tank to replace the withdrawn coolant fluid, such as drawing coolant fluid from supplementary tank 94 into primary coolant tank 86 via check valve 87, as illustrated by FIG. 26. At 610, upon the thermal management system being filled with coolant fluid, process 600 includes disconnecting the supplementary coolant tank from the primary coolant tank of the electric vehicle.

Although specific examples have been illustrated and described herein, a variety of alternate and/or equivalent implementations may be substituted for the specific examples shown and described without departing from the scope of the present disclosure. For example, as mentioned above, although a thermal management system in accordance with the present disclosure is primarily illustrated and described with respect to an electric snowmobile, it is noted that the thermal management system described herein is suitable for use with other types of electric vehicles, including automotive electric vehicles (e.g. electric cars, vans and trucks) and various EPVs such as, for example, ATVs, UTVs, and electric motorcycles among other possibilities. This application is intended to cover any adaptations or variations of the specific examples discussed herein.

Example embodiments will now be provided.

Example embodiment 1. An electric vehicle comprising: a battery including: a plurality of battery cells, a plurality of thermal panels interleaved with the plurality of battery cells to form a battery stack, each thermal panel including walls defining at least one fluid channel; at least one retention element to apply a retention pressure to the battery stack to compress the plurality of battery cells and plurality of thermal panels of the battery stack, the walls of the thermal panels being under compression by a stack pressure including at least the retention pressure; and a pump to circulate a thermal transfer fluid through the at least one fluid channel of each thermal panel, the pump to create a fluid pressure within the at least one fluid channel of each thermal panel that is greater than or equal to the stack pressure.

Example embodiment 2. The electric vehicle of example embodiment 1, the walls of each thermal panel including a non-rigid wall having an outer surface in contact with at least one battery cell and an inner surface defining the at least one fluid channel of the thermal panel.

Example embodiment 3. The electric vehicle of example embodiment 2, the fluid pressure of the thermal transfer fluid supporting the non-rigid wall to inhibit collapse of the at least one fluid channel due to the stack pressure.

Example embodiment 4. The electric vehicle of example embodiment 2, the fluid pressure within the at least one fluid channel pressing the outer surface of the non-rigid wall against the at least one battery cell.

Example embodiment 5. The electric vehicle of example embodiment 1, the stack pressure including an expansion pressure exerted by the battery cells during operation.

Example embodiment 6. The electric vehicle of example embodiment 5, wherein the expansion pressure results from at least a state of charge of the battery cell.

Example embodiment 7. The electric vehicle of example embodiment 1, the stack pressure including air pressure caused by expansion of ambient air disposed between thermal control panels and adjacent battery cells.

Example embodiment 8. The electric vehicle of example embodiment 1, wherein the at least one fluid channel in different thermal panels of the plurality of thermal panels are under different compressive stack pressures, wherein the fluid pressure is at least equal to a greatest compressive stack pressure of the different compressive stack pressures.

Example embodiment 9. The electric vehicle of example embodiment 1, each thermal panel of the plurality of thermal panels including a plurality of fluid channels under different compressive stack pressures, wherein the fluid pressure is at least equal to a greatest compressive stack pressure of the different compressive stack pressures.

Example embodiment 10. The electric vehicle of example embodiment 1, wherein the stack pressure is a predetermined expected stack pressure.

Example embodiment 11. The electric vehicle of example embodiment 1, wherein the pump is to operate at a predetermined fixed speed to provide the fluid pressure greater than or equal to the stack pressure.

Example embodiment 12. The electric vehicle of example embodiment 1, further including: a pressure gauge to measure the fluid pressure of the thermal transfer fluid at an inlet to the battery; and a controller to adjust a speed of the pump to maintain the fluid pressure at a level at least equal to the stack pressure based on the measured fluid pressure.

Example embodiment 13. The electric vehicle of example embodiment 1, comprising a thermal fluid circulation loop including a heat exchanger, the pump and the thermal panels, the thermal panels being positioned between an outlet of the pump and an inlet of the heat exchanger in the thermal fluid circulation loop.

Example embodiment 14. The electric vehicle of example embodiment 1, wherein the fluid pressure is greater than 10 pounds per square inch.

Example embodiment 15. A method comprising:
filling a primary coolant tank of a thermal management system of an electric vehicle with a thermal transfer fluid; fluidically connecting a supplementary coolant tank to the primary coolant tank, the supplementary coolant tank separate from the electric vehicle; operating a pump of the thermal management system to draw thermal transfer fluid from the primary coolant tank to fill fluid pathways of the thermal management system, the fluid pathways including at least one fluid channel within each of a plurality of thermal panels interleaved with a plurality of battery cells in a battery of the electric vehicle, where thermal transfer fluid is drawn from the supplementary coolant tank into the primary coolant tank as thermal transfer fluid is drawn from the primary coolant tank into the fluid pathways; and disconnecting the external supplementary tank from the primary coolant tank.

Example embodiment 16. The method of example embodiment 15, wherein fluidically connecting the supplementary coolant tank to the primary coolant tank includes fluidically connecting the supplementary coolant tank to the primary coolant tank via a valve to prevent backflow of coolant fluid from the primary coolant tank into the supplementary coolant tank.

Example embodiment 17. The method of example embodiment 15, wherein a replacement volume of thermal transfer fluid drawn into the primary coolant tank from the supplementary coolant tank replaces a volume of thermal transfer fluid drawn into the fluid pathways from the primary coolant tank.

Example embodiment 18. The method of example embodiment 15, including placing the primary coolant tank at a low-pressure side of the pump.

Example embodiment 19. The method of example embodiment 15, including placing the battery at a high-pressure side of the pump.

Example embodiment 20. The method of example embodiment 15, wherein operating the pump comprises creating a fluid pressure greater than 10 pounds per square inch within the at least one fluid channel of each thermal panel.

Example embodiment 21. The method of example embodiment 15, wherein thermal transfer fluid drawn from the supplementary coolant tank into the primary coolant tank as thermal transfer fluid is drawn from the primary coolant tank into the fluid pathways creates a static fluid pressure within the fluid pathways when the pump is turned off.

Example embodiment 22. The method of example embodiment 21, wherein the static fluid pressure is greater than 5 pounds per square inch.

Example embodiment 23. A thermal management system for an electric vehicle comprising: a plurality of thermal panels interleaved between battery cells in a battery stack of the electric vehicle, the thermal panels and battery cells held together under a stack pressure, each thermal panel defining at least one fluid channel; and a pump to circulate a thermal transfer fluid through the fluid channels, the pump to operate to create a fluid pressure greater than or equal to the stack pressure such that the thermal transfer fluid supports the at least one fluid channel of each thermal panel to inhibit collapse of the at least one fluid channel.

Example embodiment 24. The thermal management system of example embodiment 23, wherein the stack pressure is a predetermined stack pressure.

Example embodiment 25. The thermal management system of example embodiment 23, the stack pressure including an expansion pressure exerted by expansion of the battery cells resulting from charging and discharging of the battery cells.

Example embodiment 26. The thermal management system of example embodiment 23, the stack pressure including air pressure resulting from expansion of ambient air disposed between cooling panels and adjacent battery cells.

Example embodiment 27. The thermal management system of example embodiment 23, the pump is to operate at a fixed speed to provide the fluid pressure greater than or equal to the stack pressure.

Example embodiment 28. The thermal management system of example embodiment 23, further including: a pressure gauge to measure the fluid pressure of the thermal transfer fluid at an inlet the battery stack; and a controller to adjust a speed of the pump to maintain the fluid pressure at a level at least equal to the stack pressure based on the measured fluid pressure.

Example embodiment 29. The thermal management system of example embodiment 23, wherein the thermal panels include walls defining the fluid channels and contacting adjacent battery cells, the walls being formed of a non-rigid material.

Example embodiment 30. The thermal management system of example embodiment 23, comprising a thermal fluid circulation loop including a heat exchanger, the pump and the thermal panels, the thermal panels being positioned between an outlet of the pump and an inlet of the heat exchanger in the thermal fluid circulation loop.

Example embodiment 31. The thermal management system of example embodiment 23, wherein the fluid pressure is greater than 10 pounds per square inch.

The invention claimed is:

1. An electric vehicle comprising:
   a battery including:
      a plurality of battery cells,
      a plurality of thermal panels interleaved with the plurality of battery cells to form a battery stack, each thermal panel including walls defining at least one fluid channel;
      at least one retention element to apply a retention pressure to the battery stack to compress the plurality of battery cells and plurality of thermal panels of the battery stack, the walls of the thermal panels being under compression by a stack pressure including at least the retention pressure; and
   a pump to circulate a thermal transfer fluid through the at least one fluid channel of each thermal panel, the pump to create a fluid pressure within the at least one fluid channel of each thermal panel that is greater than or equal to the stack pressure.

2. The electric vehicle of claim 1, the walls of each thermal panel including a non-rigid wall having an outer surface in contact with at least one battery cell and an inner surface defining the at least one fluid channel of the thermal panel.

3. The electric vehicle of claim 2, the fluid pressure of the thermal transfer fluid supporting the non-rigid wall to inhibit collapse of the at least one fluid channel due to the stack pressure.

4. The electric vehicle of claim 1, the stack pressure including an expansion pressure exerted by the battery cells during operation.

5. The electric vehicle of claim 4, wherein the expansion pressure results from at least a state of charge of the battery cell.

6. The electric vehicle of claim 1, the stack pressure including air pressure caused by expansion of ambient air disposed between thermal control panels and adjacent battery cells.

7. The electric vehicle of claim 1, wherein the at least one fluid channel in different thermal panels of the plurality of thermal panels are under different compressive stack pressures, wherein the fluid pressure is at least equal to a greatest compressive stack pressure of the different compressive stack pressures.

8. The electric vehicle of claim 1, each thermal panel of the plurality of thermal panels including a plurality of fluid channels under different compressive stack pressures, wherein the fluid pressure is at least equal to a greatest compressive stack pressure of the different compressive stack pressures.

9. The electric vehicle of claim 1, wherein the stack pressure is a predetermined expected stack pressure.

10. The electric vehicle of claim 1, wherein the pump is to operate at a predetermined fixed speed to provide the fluid pressure greater than or equal to the stack pressure.

11. The electric vehicle of claim 1, further including:
   a pressure gauge to measure the fluid pressure of the thermal transfer fluid at an inlet to the battery; and
   a controller to adjust a speed of the pump to maintain the fluid pressure at a level at least equal to the stack pressure based on the measured fluid pressure.

12. The electric vehicle of claim 1, comprising a thermal fluid circulation loop including a heat exchanger, the pump and the thermal panels, the thermal panels being positioned between an outlet of the pump and an inlet of the heat exchanger in the thermal fluid circulation loop.

13. The electric vehicle of claim 1, wherein the fluid pressure is greater than 10 pounds per square inch.

14. A method comprising:
   filling a primary coolant tank of a thermal management system of an electric vehicle with a thermal transfer fluid;
   fluidically connecting a supplementary coolant source to the primary coolant tank, the supplementary coolant source separate from the electric vehicle;
   operating a pump of the thermal management system to draw the thermal transfer fluid from the primary coolant tank to fill fluid pathways of the thermal management system, the fluid pathways including at least one fluid channel within each of a plurality of thermal panels interleaved with a plurality of battery cells in a battery of the electric vehicle, where the thermal transfer fluid is drawn from the supplementary coolant source into the primary coolant tank as the thermal transfer fluid is drawn from the primary coolant tank into the fluid pathways; and
   disconnecting the supplementary coolant source from the primary coolant tank.

15. The method of claim 14, wherein fluidically connecting the supplementary coolant source to the primary coolant tank includes fluidically connecting the supplementary coolant source to the primary coolant tank via a valve to prevent backflow of thermal transfer fluid from the primary coolant tank into the supplementary coolant source.

16. The method of claim 14, wherein a replacement volume of thermal transfer fluid drawn into the primary coolant tank from the supplementary coolant source replaces a volume of thermal transfer fluid drawn into the fluid pathways from the primary coolant tank.

17. The method of claim 14, including placing the primary coolant tank at a low-pressure side of the pump.

18. The method of claim 14, including placing the battery at a high-pressure side of the pump.

19. The method of claim 14, wherein operating the pump comprises creating a fluid pressure greater than 10 pounds per square inch within the at least one fluid channel of each thermal panel.

20. The method of claim 14, wherein the thermal transfer fluid drawn from the supplementary coolant source into the primary coolant tank as the thermal transfer fluid is drawn from the primary coolant tank into the fluid pathways creates a static fluid pressure within the fluid pathways when the pump is turned off.

21. The method of claim 20, wherein the static fluid pressure is greater than 5 pounds per square inch.

22. A thermal management system for an electric vehicle comprising:
   a plurality of thermal panels interleaved between battery cells in a battery stack of the electric vehicle, the thermal panels and battery cells held together under a stack pressure, each thermal panel defining at least one fluid channel; and
   a pump to circulate a thermal transfer fluid through the fluid channels, the pump to operate to create a fluid pressure greater than or equal to the stack pressure such that the thermal transfer fluid supports the at least one fluid channel of each thermal panel to inhibit collapse of the at least one fluid channel.

* * * * *